US 8,686,091 B2

(12) United States Patent
Goscha et al.

(10) Patent No.: US 8,686,091 B2
(45) Date of Patent: *Apr. 1, 2014

(54) AMBIENT CURE WATER-BASED COATINGS FOR WRITABLE-ERASABLE SURFACES

(71) Applicant: IdeaPaint, Inc., Ashland, MA (US)

(72) Inventors: John Goscha, Boston, MA (US); Martin Douglas Donbrosky, Jr., Lambertville, MI (US)

(73) Assignee: IdeaPaint, Inc., Ashland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/645,225

(22) Filed: Oct. 4, 2012

(65) Prior Publication Data

US 2013/0029048 A1   Jan. 31, 2013

Related U.S. Application Data

(63) Continuation of application No. 12/351,521, filed on Jan. 9, 2009, now Pat. No. 8,309,653, which is a continuation-in-part of application No. PCT/US2007/073524, filed on Jul. 13, 2007.

(51) Int. Cl.
  *C08G 18/08* (2006.01)
  *C08L 75/00* (2006.01)
  *C08K 3/20* (2006.01)

(52) U.S. Cl.
  USPC ............. 524/591; 524/590; 524/589; 528/66; 528/59; 528/65; 106/32.5; 428/207

(58) Field of Classification Search
  USPC ................................ 524/591, 590; 528/65, 66
  See application file for complete search history.

(56) References Cited

U.S. PATENT DOCUMENTS

| | | | |
|---|---|---|---|
| 3,949,132 A | 4/1976 | Seregely et al. | |
| 4,184,885 A | 1/1980 | Pasco et al. | |
| 4,387,181 A | 6/1983 | Brown et al. | |
| 4,525,216 A | 6/1985 | Nakanishi | |
| 4,786,558 A | 11/1988 | Sumiya et al. | |
| 4,818,790 A | 4/1989 | Ooka et al. | |
| 5,024,898 A | 6/1991 | Pitts et al. | |
| 5,037,702 A * | 8/1991 | Pitts et al. ................... | 428/423.7 |
| 5,153,252 A | 10/1992 | Skora | |
| 5,227,414 A | 7/1993 | Ernst et al. | |
| 5,310,611 A | 5/1994 | Okabe et al. | |
| 5,338,793 A | 8/1994 | Loftin | |
| 5,360,642 A | 11/1994 | Chandalia et al. | |
| 5,412,021 A | 5/1995 | Nakanishi | |
| 5,629,403 A | 5/1997 | Hicks et al. | |
| 5,637,638 A | 6/1997 | Chandler et al. | |
| 5,677,363 A | 10/1997 | Imagawa | |
| 5,852,111 A | 12/1998 | Watanabe et al. | |
| 5,977,269 A | 11/1999 | Kovar et al. | |
| 6,031,023 A | 2/2000 | Carroll et al. | |
| 6,114,489 A | 9/2000 | Vicari et al. | |
| 6,265,074 B1 | 7/2001 | Shah et al. | |
| 6,277,485 B1 | 8/2001 | Invie et al. | |
| 6,306,508 B1 | 10/2001 | Black et al. | |
| 6,310,127 B1 | 10/2001 | Jablon | |
| 6,326,437 B1 | 12/2001 | Tsuda et al. | |
| 6,350,806 B1 | 2/2002 | Tsuda et al. | |
| 6,379,001 B1 | 4/2002 | Tomida et al. | |
| 6,383,651 B1 | 5/2002 | Weinert et al. | |
| 6,423,418 B1 | 7/2002 | Callicott et al. | |
| 6,476,965 B1 * | 11/2002 | He et al. ........................ | 359/455 |
| 6,541,552 B1 | 4/2003 | Tsuda et al. | |
| 6,579,966 B1 | 6/2003 | Weinert et al. | |
| 6,580,481 B2 | 6/2003 | Ueda et al. | |
| 6,620,500 B2 | 9/2003 | Sweet et al. | |
| 6,686,051 B1 | 2/2004 | Weinert et al. | |
| 6,703,452 B2 * | 3/2004 | Huynh-Ba .................... | 525/453 |
| 6,767,591 B2 | 7/2004 | Meccia et al. | |
| 6,878,414 B2 | 4/2005 | Meccia et al. | |
| 7,001,952 B2 | 2/2006 | Faler et al. | |
| 8,309,653 B2 * | 11/2012 | Goscha et al. ................ | 524/591 |
| 2003/0083416 A1 | 5/2003 | Kaufhold et al. | |
| 2003/0216516 A1 * | 11/2003 | Swarup et al. ................ | 525/123 |
| 2004/0019160 A1 | 1/2004 | Dai et al. | |
| 2004/0077497 A1 | 4/2004 | Korane et al. | |
| 2004/0081844 A1 * | 4/2004 | Bharti et al. .................. | 428/523 |
| 2006/0024461 A1 | 2/2006 | Gustafson et al. | |
| 2006/0024463 A1 | 2/2006 | Gustafson et al. | |
| 2006/0024504 A1 | 2/2006 | Nelson et al. | |

(Continued)

FOREIGN PATENT DOCUMENTS

| | | |
|---|---|---|
| AU | 535 211 B2 | 3/1984 |
| DE | 102006056690 A1 | 1/2008 |

(Continued)

OTHER PUBLICATIONS

International Search Report for PCT/US2011/035396, mailed on Oct. 12, 2011 (6 paged).
Written Opinion for PCT/US2011/035396, mailed on Oct. 12, 2011 (12 pages).
Annex to Form PCT/ISA/206, Communication Relating to the Results of the Partial International Search for PCT/US2011/035396, mailed Aug. 5, 2011.
European Search Report for PCT/US2009/050976, mailed on Jan. 3, 2012 (9 pages).
Material Safety Data Sheet, Speclt HP 6PK Dry Erase Activator, Identification 241119, revision date Oct. 20, 2011 (5 pages).
Material Safety Data Sheet, SEM-Speclt QT 4PK Dry Erase Base, Identification 241118, revision date Nov. 28, 2011 (5 pages).
Write Up Dry Erase Paint, writeUp h2o fact sheet, (1 page).

(Continued)

*Primary Examiner* — Irina Krylova
(74) *Attorney, Agent, or Firm* — Choate, Hall & Stewart LLP; Brenda Herschbach Jarrell; John J. Cahill

(57) ABSTRACT

Water-based coatings having writable-erasable surfaces are provided. The coatings have many desirable attributes. For example, the coatings cure under ambient conditions, have low or no VOC emissions during and upon curing, and have reduced tendency to form ghost images, even after prolonged normal use.

10 Claims, 3 Drawing Sheets

(56) References Cited

U.S. PATENT DOCUMENTS

| | | |
|---|---|---|
| 2006/0287217 A1 | 12/2006 | Keilman et al. |
| 2007/0072989 A1 | 3/2007 | Piret et al. |
| 2007/0091073 A1 | 4/2007 | Nakata et al. |
| 2007/0142517 A1 | 6/2007 | Anderson et al. |
| 2007/0167324 A1 | 7/2007 | Juang |
| 2009/0148603 A1 | 6/2009 | Goscha |
| 2009/0155462 A1 | 6/2009 | Flosbach et al. |

FOREIGN PATENT DOCUMENTS

| | | |
|---|---|---|
| EP | 414375 A1 | 2/1991 |
| EP | 659791 A1 | 6/1995 |
| JP | 04148925 A | 5/1992 |
| JP | 06344655 A | 12/1994 |
| WO | WO-01/34714 A1 | 5/2001 |
| WO | WO-2004/020221 A1 | 3/2004 |
| WO | WO-2006/044376 A1 | 4/2006 |
| WO | WO-2009/009273 A1 | 1/2009 |
| WO | WO-2009/011694 A1 | 1/2009 |
| WO | WO-2010/009384 A1 | 1/2010 |

OTHER PUBLICATIONS

Resene Write-on Wall Paint, Resene, Dec. 2009, (2 pages).
Paint Description, Whitey board, Think out loud, (1 page).
Material Safety Data Sheet, Whitey board, Think out loud, (2 pages), Jan. 2012.
Paquepintes, (1 page), Mar. 15, 2012.
Scribi Whiteboardverf Gamma, (1 page), Mar. 15, 2012.
Sketch pintura para pizarron, (1 page), Mar. 15, 2012.
Material Safety Data Sheet-Part A and B, Wink wallsloveink.com, (12 pages), Date of Preparation Jan. 1, 2011.
European Search Report, 10150298.7, mailed on Mar. 23, 2012. 3 pages.
International Search Report and the Written Opinion of the International Searching Authority of International Application No. PCT/US2009/050976 mailed Aug. 27, 2009 (10 pages).
International Search Report and the Written Opinion of the International Searching Authority of International Application No. PCT/US07/73524 mailed Apr. 1, 2009 (11 pages).

* cited by examiner

AMBIENT CURE WATER-BASED COATINGS FOR WRITABLE-ERASABLE SURFACES

CROSS-REFERENCE TO RELATED APPLICATIONS

This application is a continuation and claims the benefit of and priority to co-pending application, U.S. Non-Provisional application Ser. No. 12/351,521, filed Jan. 9, 2009, which is a continuation-in-part of PCT Patent Application Serial No. PCT/US2007/073524, filed Jul. 13, 2007, the complete disclosure of which is incorporated by reference herein.

TECHNICAL FIELD

This disclosure relates to water-based coatings for writable-erasable surfaces, products that include such coatings, and to the methods of making the same.

BACKGROUND

Classroom education has traditionally relied upon a "blackboard" and chalk as an instruction medium. This technique can be messy, dusty, and many blackboards cannot be used with all chalk types and colors. The dust generated can lead to many respiratory afflictions. Overhead projectors, laptop computers and dry erase boards (often referred to commonly as "whiteboards") are alternatives to traditional blackboards.

Dry erase boards typically include a substrate, such as paper or board, and a coating, such as a lacquer coating, extending upon the substrate. The coating provides a writing surface that can be marked using dry erase marking pens. Dry erase marking pens, which are typically felt tip marking instruments, contain inks that not only can mark such surfaces, but also can be erased with minimal effort using, e.g., a dry eraser, cloth, or paper tissue.

The erasability of dry erase inks from the writing surfaces of dry erase boards can deteriorate over time, resulting in the formation of non-removable "ghost images." In addition, such surfaces can be incompatible with some dry erase markers, and can be permanently marked if inadvertently written on with a permanent marker.

SUMMARY

This disclosure relates to coatings having writable-erasable surfaces, products that include such coatings (e.g., whiteboards), and to methods of making and using the same. Generally, the coatings having the writable-erasable surfaces are produced from one or more precursor materials in a water-based carrier; the coatings cure under ambient conditions. When the writing surface is marked with a marking material, such as a water- or alcohol-based marking material, the marking material can be erased to be substantially invisible with little or no ghosting, even after prolonged and repeated use. The one or more materials that form the coatings emit minimal volatile organic compounds (VOCs) during their application to a substrate or during their curing on the substrate. The resulting coatings have many desirable attributes, including one or more of the following: low porosity, low surface roughness, high elongation at break, high Taber abrasion resistance, and high Sward hardness. Generally, while not intending to be bound by any theory, it is believed that the low porosity of the coatings makes the coatings substantially impervious to the marking materials, while the low surface roughness prevents the marking materials from becoming entrapped on the surface beyond effective reach of an eraser.

In one aspect of the disclosure, a writable-erasable product includes a cured coating (such as crosslinked) extending upon a substrate and having a writable-erasable surface. The coating is curable under ambient conditions, and can be formed from one or more materials, each of the one or more materials including one or more functional groups independently selected from G1 and G2, with at least one material of the one or more materials in a water-based carrier, wherein each G1 functional group is independently selected from among isocyanate, epoxide, urethane, ethyleneoxy, and ethylene, wherein the ethylene is optionally substituted with hydroxyl, acetoxy, or alkoxycarbonyl; and each G2 functional group is independently selected from among hydroxyl, amine, phenol, carboxylic acid, acid anhydride, aziridine, and thiol. After the writable-erasable surface is marked with a marking material including a colorant and a solvent, the solvent including one or more of water, alcohols, alkoxy alcohols, ketones, ketonic alcohols, esters, acetates, mineral spirits, or mixtures thereof, the marking material can be erased from the writable-erasable surface to be substantially invisible.

In some implementations, the coating can be formed from one or more materials, each of the one or more materials including one or more G1 functional groups, with at least one material of the one or more materials in a water-based carrier.

In some implementations, the coating can be formed from two or more materials, wherein a first material includes one or more G1 functional groups and a second material includes one or more G2 functional groups, with at least one material of the two or more materials in a water-based carrier.

In some implementations, the cured coating and/or the writable-erasable surface may have one or more of the following attributes. The coating may have a porosity of less than about 40 percent; a thickness of from about 0.001 inch to about 0.125 inch; a Taber abrasion value of from about 100 to about 125 mg/thousand cycles; a Sward hardness of greater than about 10; an elongation at break of between about 5 percent to about 400 percent; a sag resistance of between about 4 and about 24; a VOC content of less than about 350 g/L (such as less than about 50 g/L).

In some implementations, G1 is isocyanate, epoxide, urethane, ethyleneoxy, and/or ethylene optionally substituted with hydroxyl, acetoxy, or alkoxycarbonyl.

In some implementations, G1 is ethylene substituted with alkoxycarbonyl, or ethylene optionally substituted with acetoxy.

In some implementations, the one or more materials including one or more G1 groups wherein G1 is ethylene substituted with alkoxycarbonyl, further includes one or more materials including one or more G1 groups wherein G1 is ethyleneoxy.

In some implementations, the one or more materials is a polyurethane. In such implementations, the one or more materials can further include a polyacrylate.

In some implementations, the one or more materials is in the form of a dispersion.

In some implementations, G2 is hydroxyl, amine, phenol, carboxylic acid, acid anhydride, aziridine, and/or thiol.

In some implementations, when G1 is epoxide, G2 can be hydroxyl or amine; when G1 is isocyanate, G2 can be hydroxyl or amine; and/or when G1 is urethane, G2 can be aziridine.

In some implementations, the one or more materials including one or more G1 functional group can be selected from hexamethylene diisocyanate (HDI), tetramethylene diisocyanate, octamethylene diisocyanate, decamethylene diisocyanate, 2-methylpentane-1,5-diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl) cyclohexane (H6XDI), dicyclohexylmethane diisocyanate (H12MDI), dimer acid diisocyanate (DDI), trimethyl hexamethylene diisocyanate, lysine diisocyanate and its methyl ester, methyl cyclohexane diisocyanate, 1,5-napthalene diisocyanate, xylene diisocyanate, polyphenylene diisocyanates, isophorone diisocyanate (IPDI), hydrogenated methylene diphenyl isocyanate (HMDI), tetramethyl xylene diisocyanate (TMXDI), or their oligomers and homopolymers, and their mixtures.

In some implementations, the one or more materials including one or more G1 functional group includes an aliphatic diisocyanate (e.g., hexamethylene-1,6-diisocyanate, IPDI and the like) such as an hydrophilic aliphatic diisocyanate or their oligomers and homopolymers (e.g., homopolymer of hexamethylene-1,6-diisocyanate), or their mixtures.

In some implementations, the one or more materials including one or more G1 functional group includes a polymeric material.

In some implementations, the one or more materials including one or more G2 functional group includes an $\alpha,\omega$-diol.

In some implementations, the one or more materials including one or more G2 functional group includes a polymeric material (e.g., an acrylic polyol or an acrylic based diol).

The writable-erasable surface can be erased to be substantially invisible after writing and erasing at the same position for more than about 100 cycles, or even more than about 5,000 cycles. The writable-erasable surface can have an average surface roughness ($R_a$) of less than about 7,500 nm; a maximum surface roughness ($R_m$) of less than about 10,000 nm; a contact angle of greater than about 35 degrees; a contact angle of less than about 150 degrees.

In some implementations, the substrate can be selected from the group consisting of cellulosic material, glass, wall (such as plaster or painted), fiber board (e.g., a whiteboard in which the cured coating can extend upon a fiber board), particle board (e.g., a chalkboard or blackboard), gypsum board, wood, densified ceramics, stone (such as granite), and metal (such as aluminum or stainless steel).

In some implementations, the substrate can be selected from a flexible film or a rigid immovable structure.

In some implementations, the marking material can be erased from the writable-erasable surface to be substantially invisible by wiping the marks with an eraser including a fibrous material.

In some implementations, the eraser includes water, alcohol (e.g., ethanol, n-propanol, isopropanol, n-butanol, isobutanol, benzyl alcohol), alkoxy alcohol (e.g., 2-(n-propoxy) ethanol, 2-(n-butoxy)ethanol, 3-(n-propoxy)ethanol), ketone (e.g., acetone, methyl ethyl ketone, methyl n-butyl ketone), ketonic alcohol (e.g., diacetone alcohol), ester (e.g., methyl succinate, methyl benzoate, ethyl propanoate), acetate (e.g., methyl acetate, ethyl acetate, n-butyl acetate, t-butyl acetate), or mineral spirit.

In some implementations, the writable-erasable product can form a whiteboard in which the cured coating extends upon a fiberboard; can form a part of a wall e.g., of a structure; or can form a plurality of sheets, each sheet including a substrate (e.g., in the form of a paper) having the cured coating extending thereupon.

In another aspect, the disclosure describes a method of making a writable-erasable product, the method including applying a coating to a substrate, and curing the coating (e.g., under ambient conditions) to provide a cured coating defining a writable-erasable surface. After the writable-erasable surface is marked with a marking material, the marking material can be erased from the writable-erasable surface to be substantially invisible.

In such implementations, the coating includes one or more materials, each of the one or more materials including one or more functional groups independently selected from G1 and G2, with at least one material of the one or more materials in a water-based carrier, wherein each G1 functional group is independently selected from among isocyanate, epoxide, urethane, ethyleneoxy, and ethylene, wherein the ethylene is optionally substituted with hydroxyl, acetoxy, or alkoxycarbonyl; and each G2 functional group is independently selected from among hydroxyl, amine, phenol, carboxylic acid, acid anhydride, aziridine, and thiol.

In such implementations, the marking material includes a colorant and a solvent (e.g., water, alcohol, alkoxy alcohol, ketone, ketonic alcohol, ester, acetate, mineral spirit, or their mixtures).

In some implementations, the coating prior to application has less than about 350 g/L of VOCs (e.g., less than about 50 g/L of VOCs).

In some implementations, the coating can be prepared by combining the one or more materials including one or more G1 functional group (e.g., an isocyanate), and the one or more materials including one or more G2 functional group (e.g., an hydroxyl).

In some implementations, prior to combining, the one or more materials including one or more G1 functional group (e.g., an isocyanate) can be in a first container, and the one or more materials including one or more G2 functional group (e.g., an hydroxyl) can be in a second container.

In some implementations, the one or more materials including one or more G2 functional group (e.g., an hydroxyl) also includes a crosslinking agent having a functionality of two or greater.

In some implementations, the one or more materials can be in a water-based carrier.

In another aspect, the disclosure describes a method of changeably presenting information including selecting a writable-erasable product, marking the writable-erasable surface with a first information with a marking material. After the surface has been marked with the marking material, erasing the marking of the first information (e.g., by applying an eraser to the writable-erasable surface) from the writable-erasable surface to be substantially invisible; marking the writable-erasable surface with a different information and erasing the marking of the different information from the writable-erasable surface to be substantially invisible.

In some implementations, the coating can be formed from one or more materials, each of the one or more materials including one or more functional groups independently selected from G1 and G2, at least one material of the one or more materials in a water-based carrier, wherein each G1 functional group is independently selected from among isocyanate, epoxide, urethane, ethyleneoxy, and ethylene, wherein the ethylene is optionally substituted with hydroxyl, acetoxy, or alkoxycarbonyl; and each G2 functional group is independently selected from among hydroxyl, amine, phenol, carboxylic acid, acid anhydride, aziridine, and thiol.

In some implementations, the coating can be formed from one or more materials including one or more isocyanate groups, one or more materials including one or more hydroxyl groups, at least one material of the one or more materials in a water-based carrier.

In some implementations, the marking material includes a colorant and a solvent (e.g., water, alcohol, alkoxy alcohol, ketone, ketonic alcohol, ester, acetate, mineral spirit, or their mixtures).

In some implementations, the eraser includes a fibrous material.

In some implementations, the eraser includes water, alcohol, alkoxy alcohol, ketone, ketonic alcohol, ester, acetate, mineral spirit, or their mixtures.

In some implementations, the marking and erasing of different information are performed repeatedly.

In another aspect, the disclosure describes a composition including an hydrophilic aliphatic diisocyanate or their homopolymers and oligomers, an acrylic polyol, water, and optionally an accelerator and/or an acid promoter.

In some implementations, the composition can include titanium dioxide, a surface additive, a wetting agent, a defoaming agent, a pigment or a colorant.

In some implementations, the composition can have less than about 350 g/L of VOCs (e.g., less than about 50 g/L of VOCs).

In another aspect, the disclosure describes a writable-erasable product including a cured coating extending upon a substrate and having a writable-erasable surface. The coating can cure under ambient conditions and can be formed from a material in a water-based carrier. After the writable-erasable surface is marked with a marking material, including a colorant and a solvent (e.g., water, alcohol, alkoxy alcohol, ketone, ketonic alcohol, ester, acetate, mineral spirit, or their mixtures), the marking material can be erased from the writable-erasable surface to be substantially invisible.

Implementations and/or aspects may include one or more of the following advantages. The coating surfaces are writable and erasable. The coatings can provide writing surfaces that exhibit little or no image ghosting, even after prolonged normal use. The coatings can be simple to prepare, and can be applied to many different substrates, including both porous (e.g., paper) and non-porous substrates (e.g., densified ceramics). The coatings can be applied to various substrates including, but not limited to, old chalkboards (e.g., blackboards), whiteboards, drywalls, gypsum boards, plaster and painted walls. The water-based coatings can be applied on the substrate on-site to make a writable-erasable product rather than the writable-erasable product being manufactured in a factory. For many substrates, a single coating can provide an adequate writable-erasable surface. The coatings can exhibit good adhesive strength to many substrates. Coating components (prior to mixing) can have an extended shelf-life, e.g., up to about three years. The coatings can be readily resurfaced. The coatings can cure rapidly, e.g., in less than 4 hours, under ambient conditions. The coatings can resist yellowing, as determined by ASTM method G-154, for an extended period of time (e.g., up to 2000 hours). The coatings do not require UV light or high-energy radiation, such as a beam of electrons, for curing. Nevertheless, in some implementations, light, e.g., UV light, or heat can be utilized to enhance the curing rate. The coatings can have a reduced tendency to run, even when applied upon a vertical substrate. Surface gloss of the coatings can be readily adjusted. The writing surface of the coating can be projectable. The coatings can be hard. The coatings can be substantially impervious to organic solvents and/or inks. The coatings can have a low porosity. Surfaces of the coatings can have a low roughness. The coatings can be impact resistant. The coatings can be made scratch and abrasion resistant. The coatings can be relatively low cost. The coatings can have a high chemical resistance.

"Curing" as used herein refers to one or more of solvent evaporation (drying), radiation effected curing, coalescence, catalyzed polymerization, oxidative cross-linking, or other methods of cross-linking.

"Ambient conditions" as used herein refers to nominal, earth-bound conditions as they exist at sea level at a temperature of about 45-130° F.

A "water-based carrier" as used herein is one that does not have more than about 350 g/L of volatile organic compounds (VOCs), as determined by the EPA Method 24.

"Substantially invisible" as used herein refers to a color difference, Delta E ($\Delta E$) of less than 10 as calculated according to the ASTM Test Method D2244.

"Alkyl" as used herein refers to a saturated or unsaturated hydrocarbon containing 1-20 carbon atoms including both acyclic and cyclic structures (such as methyl, ethyl, propyl, isopropyl, butyl, iso-butyl, sec-butyl, pentyl, hexyl, cyclopropyl, cyclobutyl, cyclopentyl, cyclohexyl, propenyl, butenyl, cyclohexenyl and the like). A linking divalent alkyl group is referred to as an "alkylene" (such as ethylene, propylene and the like).

As used herein, "aryl" refers to monocyclic or polycyclic (e.g., having 2, 3 or 4 fused rings) aromatic hydrocarbons such as phenyl, naphthyl, anthracenyl, phenanthrenyl, indanyl, indenyl, and the like. In some embodiments, aryl groups have from 6 to about 20 carbon atoms, from 6 to about 15 carbon atoms, or from 6 to about 10 carbon atoms.

As used herein, "aralkyl" refers to alkyl substituted by aryl. An example aralkyl group is benzyl.

As used herein, "alkoxy" refers to an —O-alkyl group. Example alkoxy groups include methoxy, ethoxy, propoxy (e.g., n-propoxy and isopropoxy), t-butoxy, and the like.

As used herein, "oxyalkylene" refers to an —O-alkylene group.

As used herein, "alkoxylate" refers to an alkyl-C(O)O. Example alkoxylates include acetate, stearate and the like.

A "polyol" as used herein is a moiety that includes at least two hydroxyl (—OH) groups. The hydroxyl groups can be terminal and/or non-terminal. The hydroxyl groups can be primary hydroxyl groups.

A "polyurethane" as used herein is a polymeric or oligomeric material that includes a urethane linkage, [NHC(=O)O], in its backbone.

All publications, patent applications, patents, and other references mentioned herein are incorporated by reference herein in their entirety.

The details of one or more implementations of the disclosure are set forth in the accompanying drawings, and in the description below. Other features, and advantages will be apparent from the description and drawings, and from the claims.

BRIEF DESCRIPTION OF DRAWINGS

Like reference symbols in various drawings indicate like elements.

DETAILED DESCRIPTION

Figure 1:
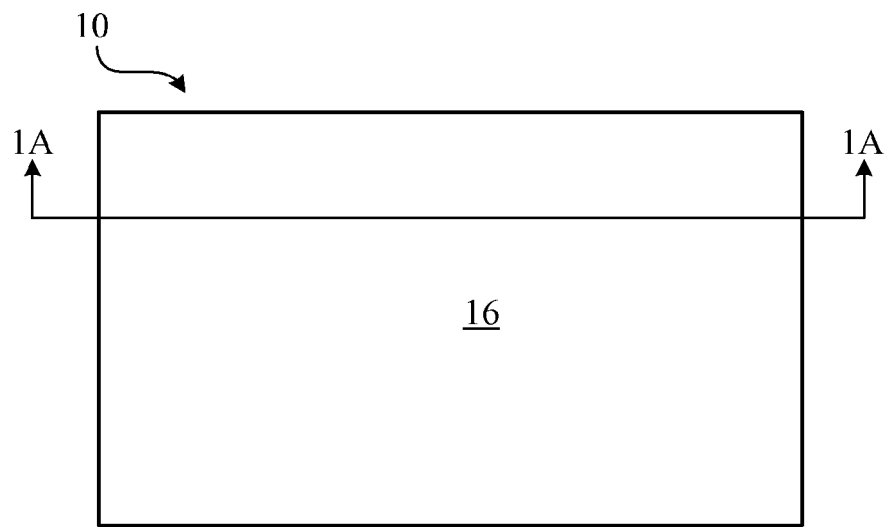
FIG. 1 is a top view of a writable-erasable product.
Figure 1A:
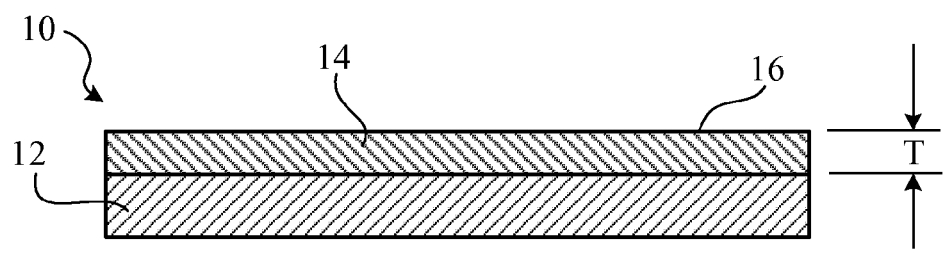
FIG. 1A is a cross-sectional view of the writable-erasable product of FIG. 1, taken along 1A-1A.

Writable-Erasable Product:

Referring to FIGS. 1 and 1A, a writable-erasable product 10 includes a substrate 12 and a cured coating 14 extending upon the substrate 12. The coating 14 has a writable-erasable surface 16. When the writable-erasable surface 16 is marked with a marking material, the marking material can be erased from the writable-erasable surface to be substantially invisible, resulting in little or no ghosting, even after prolonged normal use, e.g., after about 5,000 cycles (e.g., about 10 cycles, about 50 cycles, about 100 cycles, about 500 cycles, about 1,000 cycles, about 2,000 cycles, about 3,000 cycles, about 4,000 cycles, about 5,000 cycles, about 6,000 cycles, about 7,000 cycles, about 8,000 cycles, or about 9,000 cycles) of writing and erasing at the same position. The visibility, or the lack thereof, of the erasing can be determined by measuring the color change, Delta E ($\Delta E$), on the writable-erasable surface using a spectrophotometer (such as the SP-62 portable spectrophotometer available from X-Rite), after marking on the surface and erasing the marking. The marking material can include a colorant (e.g., a pigment) and a solvent such as water, alcohol, acetate, alkoxy alcohol, ketone, ketonic alcohol, ester, acetate, mineral spirit, or mixtures thereof. The marking material can be selected from any of the industry standard dry-erase markers.

The materials that form the coating 14 can be applied to many different types of substrates, including porous (e.g., paper) and non-porous substrates (e.g., densified ceramics). The substrate 12 could be a flexible film or a rigid movable or immovable structure. Examples of the substrate include, but are not limited to, a polymeric material (such as polyester or polyamide), cellulosic material (such as paper), glass, wood, wall (such as plaster or painted), fiber board (such as a whiteboard in which the cured coating extends upon a fiber board), particle board (such as a chalkboard or blackboard), gypsum board, densified ceramics, stone (such as granite), and metal (such as aluminum or stainless steel). The substrate could be a newly built structure or even a old and worn out chalkboard, blackboard, or whiteboard. In some instances, the surface of the substrate can be cleaned by sanding the surface and priming the surface prior to application of the coating. In some instances, the surface can also be cleaned with a cleaning agent (e.g., a mild acid) in order to provide better adhesion of the coating to the surface.

The materials that form the coating 14, prior to the application on substrates, can have a pot life which is the time during which the materials must be applied on the substrate. In some implementations, the materials can have a pot life of from about 10 minutes to about 16 hours, e.g., from about 30 minutes to about 12 hours, from about 60 minutes to about 8 hours, from about 1 hour to about 4 hours, or from about 1 hour to about 2 hours. In other implementations, the materials can have a pot life of greater than about 6 months, e.g., about 12 months, about 18 months, about 24 months, about 30 months, or about 36 months.

The materials that form the coating 14, upon application to the substrates, typically cure under ambient conditions. Curing, here, refers to the process of setting of the materials that form the coating on the substrate. It could refer to the process of simple evaporation of the solvent from the materials that form the coating; the different methods of crosslinking among the materials that form the coating including, but not limited to, oxidative cross-linking and catalyzed polymerization. Cross-linking between polymeric chains, either chemical or physical, can influence certain unique properties of coatings. In some optional implementations, the cure could be facilitated by UV-light, thermal means, initiators, or electron-beam. The coating 14 can cure under ambient conditions in from about 4 hours to about a week, e.g., from about 4 hours to about 24 hours, from about 8 hours to about 20 hours, from about 12 hours to about 16 hours, from about 1 day to about 7 days, from about 2 days to about 6 days, or from about 3 days to about 5 days.

The materials that form the coating 14, emit little or no VOCs, e.g., solvents and/or formaldehyde, during application to the substrate 12. The cured coatings 14 can be generally stable and can also emit relatively little or no VOCs. The decreased amount of volatile content (usually solvents) and ambient cure can reduce environmental impact and can make the materials less toxic (decreased inhalation and absorption) and safer (decreased flammability and flash point) to use. The reduced emission of organic solvents during the application of the water-based coating ensures that the application area need not be isolated from other areas, need not be well ventilated, and that little or no personal protection equipment is required. The use of ambient cure material allows for energy efficiency during the curing process as compared to curing processes that require energy in the form of radiation. The reduced amounts of organic solvents can also lead to increased pot life of the coating material and hence decreased material waste. Low VOC emissions and ambient cure can also provide coatings and/or writable-erasable surfaces that have one or more of the desirable attributes, such as low porosity, low surface roughness, high elongation at break, high Taber abrasion resistance, and high Sward hardness.

In some implementations, the material has less than about 350 g/L of VOCs, e.g., about 300 g/L, about 250 g/L, about 200 g/L, about 150 g/L, about 100 g/L, about 50 g/L, or even less than about 0.5 g/L of VOCs. In other implementations, the material has between about 0 and about 50 g/L of VOCs, e.g., between about 1 g/L and about 10 g/L, between about 10 g/L and about 20 g/L, between about 20 g/L and about 30 g/L, between about 30 g/L and about 40 g/L, or between about 40 g/L and about 50 g/L of VOCs. The material may also be substantially free of VOCs. Advantageously, when a VOC is utilized, it can be a VOC that is exempted from United States Environmental Protection Agency (EPA) guidelines, e.g., methyl acetate, t-butyl acetate, isopropyl alcohol, or acetone.

Porosity of the coatings can determine the amount of marking material that can be trapped in the coating. Lower porosity percentages of coatings can lead to better writable-erasable surfaces. In some implementations, the coating 14 can have a porosity of between about 1 percent and about 40 percent, e.g., between about 2 percent and about 35 percent, between about 2.5 percent and about 30 percent, between about 3 percent and about 20 percent, or between about 4 percent and about 10 percent. In other implementations, the coating 14 can have a porosity of less than about 40 percent, e.g., less than about 35 percent, less than about 30 percent, less than about 25 percent, less than about 20 percent, less than about 15 percent, less than about 10 percent, less than about 5 percent, or even less than about 2.5 percent. In some specific implementations, the coating can have a porosity of about 3 percent, about 33 percent or about 34 percent.

The coating 14 can be painted in a single coat or multiple coats using a roller, spray painted, brush painted or using other types of applicators. In some implementations, it can be painted using a foam roller in a single coat. In some implementations, the coating 14 can have a thickness, T (FIG. 1A), e.g., between about 0.001 inch and about 0.125 inch, e.g., between about 0.002 inch and about 0.1 inch, or between about 0.004 inch and about 0.08 inch, or between about 0.006 inch and about 0.06 inch, or between about 0.008 inch and about 0.04 inch, or between about 0.01 inch and about 0.02 inch. In other implementations, the coating 14 can have a thickness of greater than 0.005 inch, e.g., greater than 0.0075 inch or greater than 0.010 inch. While not intending to be bound by any theory, it is believed that providing an uniform, adequate coating thickness, T, reduces the likelihood of thin or uncoated substrate portions where marking material might penetrate.

In some implementations, the coating 14 can have a Taber abrasion value of less than about 150 mg/thousand cycles, e.g., less than about 100 mg/thousand cycles, less than about 75 mg/thousand cycles, less than about 50 mg/thousand cycles, less than about 35 mg/thousand cycles, less than about 25 mg/thousand cycles, less than about 15 mg/thousand cycles, less than about 10 mg/thousand cycles, less than about, less than about 2.5 mg/thousand cycles, less than about 1 mg/thousand cycles, or even less than about 0.5 mg/thousand cycles. Maintaining a low Taber abrasion value can provide long-lasting durability to the coating, reducing the incidence of thin spots, which could allow penetration of marking material through the coating and into the substrate.

In some implementations, the coating 14 can have a Sward hardness of greater than about 10, e.g., greater than about 15, greater than about 25, greater than about 50, greater than about 75, greater than about 100, greater than about 120, greater than about 150, or even greater than about 200. While not intending to be bound by theory, it is believed that maintaining a high Sward hardness provides long-lasting durability and scratch resistance to the coating. Marking material entrapped in scratches can be difficult to erase.

In some specific implementations, the coating can have a Sward hardness of between about 10 and about 75, e.g., between about 15 and about 70 or between about 15 and about 55. In some specific implementations, the coating can have a Sward hardness of about 15, about 22 or about 25.

In some implementations, elongation at break for the coating material can be between about 5 percent and about 400 percent, e.g., between about 25 percent and about 200 percent, or between about 50 percent and about 150 percent. In other implementations, the elongation at break can be, e.g., greater than 10 percent, e.g., greater than 25 percent, greater than 50 percent, or even greater than 100 percent. While not intending to be bound by theory, it is believed that maintaining high elongation at break provides long-lasting durability to the coating, and it allows the coating to be stressed without cracks forming. Cracks can trap marking materials, making erasure from surfaces difficult and hence decreasing the longevity of the writable-erasable products.

In some implementations, sag resistance for the coating material can be about 8 mils, e.g., about 3 mils, about 4 mils, about 5 mils, about 6 mils, about 7 mils, about 8 mils, about 9 mils, about 10 mils, about 12 mils, about 14 mils, about 16 mils, about 18 mils, about 20 mils, about 22 mils, or about 24 mils. In other implementations, the coating 14 can have sag resistance of from about 4 mils to about 24 mils, e.g., from about 5 mils to about 20 mils, from about 6 mils to about 18 mils, from about 7 mils to about 16 mils, from about 8 mils to about 14 mils, from about 9 mils to about 12 mils, or from about 10 mils to about 12 mils.

In some implementations, the writable-erasable surface can have an average surface roughness ($R_a$) of, e.g., between about 0.5 nm and about 7,500 nm, e.g., between about 1 nm and about 6,000 nm, between about 2 nm and about 5,000 nm, between about 5 nm and about 2,500 nm, between about 10 nm and about 1,500 nm, between about 20 nm and about 1,000 nm or between about 25 nm and about 750 nm. In other implementations, the coating 14 can have an average surface roughness ($R_a$) of less than about 7,500 nm, e.g., less than about 5,000 nm, less than about 3,000 nm, less than about 2,000 nm, less than about 1,000 nm, less than about 500 nm, less than about 250 nm, less than about 200 nm, less than about 100 nm, or even less than about 50 nm.

In some specific implementations, the writable-erasable surface can have an average surface roughness ($R_a$) of between about 75 nm and about 1,000 nm, e.g., between about 100 nm and about 500 nm or between about 150 nm and about 400 nm. In some specific implementations, the writable-erasable surface can have an average surface roughness ($R_a$) of about 150 nm, about 300 nm or about 1,000 nm.

In some implementations, the writable-erasable surface can have a maximum surface roughness ($R_m$) of less than about 10,000 nm, e.g., less than about 8,000 nm, less than about 6,500 nm, less than about 5,000 nm, less than about 3,500 nm, less than about 2,000 nm, less than about 1,000 nm, or less even than about 500 nm.

In some implementations, the writable-erasable surface can have a flat finish (gloss below 15, measured at 85 degrees), an eggshell finish (gloss between about 5 and about 20, measured at 60 degrees), a satin finish (gloss between about 15 and about 35, measured at 60 degrees), a semi-gloss finish (gloss between about 30 and about 65, measured at 60 degrees), or gloss finish (gloss greater than about 65, measured at 60 degrees).

In some specific implementations, the writable-erasable surface can have a 60 degree gloss of between about 45 and about 90, e.g., between about 50 and about 85. In other implementations, the writable-erasable surface can have a 20 degree gloss of between about 10 and about 50, e.g., between about 20 and about 45. In still other implementations, the writable-erasable surface can have a 85 degree gloss of between about 45 and about 90, e.g., between about 75 and about 90. In other specific implementations, the writable-erasable surface can have a 20 degree gloss of about 12, about 23, or about 46; or a 60 degree gloss of about 52, about 66, or about 85; or a 85 degree gloss of about 64, about 78, or about 88.

Figure 2:
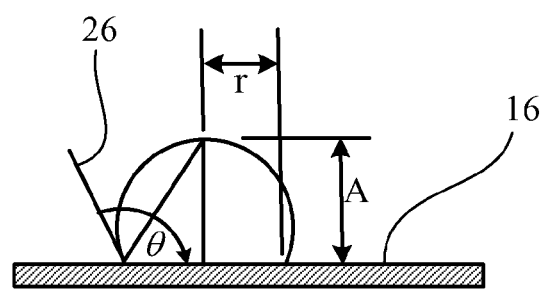
FIG. 2 is a cross-sectional view of a droplet of water on a coating and illustrates a method for determining contact angle.

In some implementations, to improve the writability and erasability of the surface of the coating, precursor materials can be chosen so that the cured coating has a surface that is relatively hydrophilic and not very hydrophobic. Referring to FIG. 2, hydrophobicity of the writable-erasable surface is related to its wetability by a liquid, e.g., water-based marking material. It is often desirable to quantitate the hydrophobicity of the writable-erasable surface by a contact angle. Generally, as described in ASTM D 5946-04, to measure contact angle, θ, for a liquid (such as water) on the writable-erasable surface 16, an angle is measured between the writable-erasable surface 16 and a tangent line 26 drawn to a droplet surface of the liquid at a three-phase point. Mathematically, θ is 2 arctan(A/r), where A is the height of the droplet image, and r is half width at the base. In some implementations, it can be desirable to have contact angle, θ, measured using deionized water, of less than about 150 degrees, e.g., less than about 125 degrees, less than about 100 degrees, less than about 75 degrees or even less than about 50 degrees. In other implementations, it can be desirable to have contact angle θ above about 35 degrees, e.g., above about 40 degrees, above about 45 degrees.

In certain implementations, contact angle, θ, measured using deionized water, can be between about 30 degrees and about 90 degrees, e.g., between about 45 degrees and about 80 degrees, or between about 39 degrees and about 77 degrees. In some specific implementations, the contact angle can be about 40 degrees, about 50 degrees, about 60 degrees, about 73 degrees, or about 77 degrees.

In some implementations, the writable-erasable surface can have a surface tension of between about 30 dynes/cm and about 60 dynes/cm, e.g., between about 40 dynes/cm and about 60 dynes/cm. In some specific implementations, the writable-erasable surface can have a surface tension of about 25 dynes/cm, about 30 dynes/cm, about 42 dynes/cm, about 44 dynes/cm or about 56 dynes/cm.

In general, the coating 14 can be formed by applying, e.g., rolling, painting, or spraying, a solution of the material in a water-based carrier that can have a sufficient viscosity such that the applied coating does not run soon after it is applied or during its curing. At the same time, the solution viscosity should be sufficient to permit easy application. For example, in some implementations, the applied solution can have a viscosity at 25° C. of between about 75 mPa·s and about 20,000 mPa·s, e.g., between about 200 mPa·s and about 15,000 mPa·s, between about 1,000 mPa·s and about 10,000 mPa·s, or between about 750 mPa·s and about 5,000 mPa·s.

Advantageously, when the writable-erasable surface is marked with a marking material that includes a colorant and a solvent that includes one or more of water, alcohols, alkoxy alcohols, ketones, ketonic alcohols, esters, acetates or mineral spirits, the marking material can be erased from the writable-erasable surface to be substantially invisible. Mixtures of any of the noted solvents may be used. For example, mixtures of two, three, four or more of the noted, or other, solvents may be used.

In some implementations, the marking material can be erased from the writable-erasable surface to be substantially invisible by wiping the marks with an eraser that includes a fibrous material. For example, the eraser can be in the form of a disposable wipe or a supported (e.g., wood, plastic) felt. The eraser can also include, e.g., one or more of water, alcohols, alkoxy alcohols, ketones, ketonic alcohols, esters, acetates or mineral spirits. Mixtures of any two or more of these solvents may also be used.

Examples of alcohols include ethanol, n-propanol, iso-propanol, n-butanol, iso-butanol, and benzyl alcohol. Mixtures of any two or more of these solvents also represent alcohols.

Examples of alkoxy alcohols include 2-(n-propoxy)ethanol, 2-(n-butoxy)ethanol and 3-(n-propoxy)ethanol. Mixtures of any two or more of these solvents also represent alkoxy alcohols.

Examples of ketones include acetone, methyl ethyl ketone and methyl n-butyl ketone. Mixtures of any two or more of these solvents may also be utilized.

Examples of acetates include methyl acetate, ethyl acetate, n-butyl acetate and t-butyl acetate. Mixtures of any two or more of these solvents may also be utilized.

For testing, the coating can be made by casting the material on a fluoropolymer substrate, and then curing the material so that it can have a dry thickness of about 0.002 inch. The cured sample can then be removed from the fluoropolymer substrate to provide the test specimen. Testing can be performed at 25° C. Elongation at break can be performed using ASTM method D-882; porosity can be measured using mercury porosimetry (suitable instruments available from Micromeritics, Norcross, Ga., e.g., Micromeritics Autopore IV 9500); surface roughness can be measured using atomic force microscopy (AFM) in tapping mode using ASME B46.1 (suitable instruments, e.g., WYKO NT8000, are available from Park Scientific); Taber abrasion resistance can be measured according to ASTM method D-4060 (wheel CS-17, 1 kg load) and Sward hardness can be measured according to ASTM method D-2134 (Sward Hardness Rocker Model C). The amount of VOCs can be determined using the EPA Method 24. Gloss can be measured using ASTM method D-523-89 (BYK Tri-Gloss Meter Cat. No. 4525). Contact angle can be measured with deionized water using the dynamic contact angle method (Angstroms Model FTA 200) using ASTM method D-5946-04. Sag resistance can be measured using ASTM method D4400. This is performed by obtaining a draw-down and measuring visually by comparison with standard ASTM pictures. Surface tension can be measured using AccuDyne Marking Pens. Stormer Viscosity can be measured on a Brookfield Viscometer by ASTM method D-562 and reported in Kreb units (Ku).

Any writable-erasable product described herein can have any one or more of any of the attributes described herein. For example, the writable-erasable surface can have an average surface roughness ($R_a$) of less than about 7,500 nm, a maximum surface roughness ($R_m$) of less than about 7,500 nm, a 60 degree gloss of less than about 50 and a contact angle of less than about 100 degrees.

Any coatings described herein can have any one or more of any of the following attributes. For example, the coating can have a porosity of less than about 45 percent, an elongation at break of between about 25 percent and about 200 percent, and/or a Sward hardness of greater than about 3 and a Taber abrasion value of less than about 150 mg/thousand cycles.

Formulations

Water-based coatings, predominantly used in architectural settings, contain binders, pigments, solvents, and/or additives. Some of the polymer systems used in the water-based coatings realm are the acrylic emulsions and urethane dispersions. Water-based coatings present potential advantages in terms of reduced odor during curing and contain lower VOCs compared to solvent-based coatings. It is also possible to formulate water-based coatings containing none of the chemicals currently classified as hazardous air pollutants (HAPs). The coating formulations, in general, can include either a one-component system or a two-component system. When the coating is formulated as a one-component system, the coating can be formed from one or more materials, each of the one or more materials including one or more functional groups independently selected from G1, with at least one material of the one or more materials in a water-based carrier. When the coating is formulated as a two-component system, the coating can be formed from two or more materials. The first material can include one or more functional groups independently selected from G1 and the second material can include one or more functional groups independently selected from G2, with at least one material of the one or more materials in a water-based carrier. Each G1 functional group in either the one-component or two-component system is independently selected from among isocyanate, epoxide, urethane, ethyleneoxy, and ethylene, wherein the ethylene is optionally substituted with hydroxyl, acetoxy, or alkoxycarbonyl. Each G2 functional group in the two-component system is independently selected from among hydroxyl, amine, phenol, carboxylic acid, acid anhydride, aziridine, and thiol. Although water is the predominant carrier, water-based coatings can contain less than about 15% of non-aqueous solvents to abet in film forming capabilities.

Polyurethanes

Polyurethanes can be obtained by the reaction of a diisocyanate or polyisocyanate with a diol, or a polyol. Polyurethanes exhibit a wide range of hardness and flexibility depending on various components including the nature of the isocyanate and/or the polyol in addition to the nature of curing. Polyurethane coatings could either be formulated as one component or two component coatings. Reactive polyurethane coatings involve the isocyanate as the reactive group during curing. See: The ICI Polyurethanes Book, George Woods. (John Wiley & Sons: New York, 1987), and Organic Coatings-Properties, Selection and Use U.S. Department of Commerce, National Bureau of Standards: Washington D.C., Series 7; February 1968, the complete disclosures of which are incorporated by reference herein. Polyurethane coatings have also been categorically assigned several ASTM designations (Types I-VI).

The coating 14 can be formed from one or more materials including diisocyanate (G1=isocyanate) and one or more materials including hydroxyl (G2=hydroxyl), at least one of these materials being in a water-based carrier. In some implementations, the coating can be or includes a reaction product of a first component that includes an isocyanate and a second component that includes a polyol. Diisocyanates for use in polyurethane applications, in general, can be obtained by the reaction of amines with phosgene. Examples of organic diisocyanates include aliphatic, cycloaliphatic (alicyclic), and aromatic diisocyanates. e.g., methylene diisocyanate, tetramethylene diisocyanate, hexamethylene diisocyanate (HDI), octamethylene diisocyanate, decamethylene diisocyanate, 2-methylpentane-1,5-diisocyanate, toluene diisocyanate (TDI), diphenylmethane diisocyanate (MDI), m- and p-phenylene diisocyanates, 4-chloro-m-phenylene diisocyanate, bitolylene diisocyanate, cyclohexane diisocyanate (CHDI), bis-(isocyanatomethyl)cyclohexane (H6XDI), dicyclohexylmethane diisocyanate (H12MDI), dimer acid diisocyanate (DDI), trimethyl hexamethylene diisocyanate, lysine diisocyanate and its methyl ester, methyl cyclohexane diisocyanate, 1,5-napthalene diisocyanate, xylene diisocyanate, polyphenylene diisocyanates, isophorone diisocyanate (IPDI), hydrogenated methylene diphenyl isocyanate (HMDI), tetramethyl xylene diisocyanate (TMXDI), 4-t-butyl-m-phenylenediisocyanate, 4,4'-methylene bis(phenyl isocyanate), tolylene diisocyanate, 4-methoxy-m-phenylene diisocyanate, biphenylene diisocyanate, cumene-2,4-diisocyanate, 3,3'-dimethyl-4,4'-biphenylene diisocyanate, p,p'-diphenylene diisocyanate, or oligomers and homopolymers thereof, and mixtures thereof. In some embodiments, the aliphatic diisocyanate, their oligomeric prepolymers, or aliphatic polyisocyanate can be hydrophilic.

The monomeric diisocyanates may further be converted into oligomeric prepolymers of higher molecular weight by treatment with diols or triols. Such oligomeric prepolymers can also be used as a reaction component in the production of the polyurethane coating. Diisocyanates for use in polyurethane applications can be available from various commercial vendors under different trade names. Examples of commercial diisocyanates include, but are not limited to, diphenylmethane diisocyanate (MDI) containing Isonate™ Papi™, Spectrim™ (available from Dow chemical company), Desmodur® polyisocyanates and Bayhydur® (available from Bayer), Sovermol® (available from Cognis), Reafree®, and Chempol® (both available from Cook Composite Polymers)

In some implementations, the percentage weight of homopolymer of aliphatic diisocyanate in the total material formulation can be about 31%, e.g., about 26%, about 27%, about 28%, about 29%, about 30%, about 31%, about 32%, about 33%, about 34%, or even about 35%. In some implementations, the percentage weight of homopolymer of aliphatic diisocyanate in the total material formulation can be from about 20% to about 40%, e.g., from about 22% to about 38%, from about 24% to about 36%, from about 26% to about 34%, or from about 28% to about 32%.

The isocyanate containing material of the formulation can have a viscosity of about 91 Kreb Units (Ku), e.g., about 85 Ku, about 90 Ku, about 95 Ku, about 100 Ku, or about 105 Ku. In some implementations, the isocyanate containing material of the formulation can have a viscosity of from about 40 Ku to about 140 Ku, e.g., from about 60 Ku to about 105 Ku, from about 70 Ku to about 105 Ku, or from about 80 Ku to about 95 Ku.

The polyurethane coatings can also contain polyurethane resins (G1=urethane). In some implementations, the polyurethane resins can be in the form of dispersions of urethane prepolymers and oligomers in a water-based carrier. In some implementations, the polyurethane dispersions can be formulated as either one component or two component coatings.

Epoxies

An epoxy coating formulation can be obtained by mixing an epoxy resin with a curing agent. The epoxy resins are polyether chains that contain one or more epoxide units in their structure. Polyethers have the repeating oxyalkylene units: alkylene substituted by oxygen groups, e.g., ethyleneoxy, —[$CH_2$—$CH_2O$]—. In some implementations, the polyether chains can have additional functional groups such as hydroxyl (—OH). Curing of epoxy resins can lead to less amount of volatile products. Due to the unique properties of the epoxide ring structure, the curing agents can be either nucleophilic or electrophilic. Nucleophilic agents such as alcohols, phenols, amines, amino silanes, thiols, carboxylic acids, and acid anhydrides can be used. In some implementations, these curing agents can contain one or more nucleophilic groups. The epoxy resins themselves can contain an aliphatic (such as, cyclic or acyclic), aromatic backbone or a combination of both. In some optional implementations, the epoxy resins can contain other non-interfering chemical linkages (such as alkyl chains).

The coating 14 can be formed from a epoxy material (G1=epoxide) and a hydroxyl or an amine material, at least one of these materials being in a water-based carrier. In some implementations, the material can be or includes a reaction product of a first component that includes an epoxide or oxirane material (such as an epoxy prepolymer) in a water-based carrier and a second component that includes an alcohol, an alkyl amine (such as, cyclic or acyclic), a polyol, a polyamine (such as isophoronediamine), a polyester polyamine, or an amido polyamine in a water-based carrier. In such implementations, the epoxide or oxirane material can serve as a crosslinking material. In some specific implementations, the epoxide material can be epichlorohydrin, glycidyl ether type (such as diglycidyl ether of bisphenol-A), oxirane modified fatty acid ester type, or oxirane modified ester type. In some specific implementations, the polyol material can be a polyester polyol, polyamine polyol, polyamide polyol, or amine adduct polyol. In some implementations, the epoxy coating can be formulated as either one component or two component coatings.

Acrylics

Polyacrylates have the repeating units of ethylene substituted by alkoxycarbonyl groups: —[$CH_2$—$CH(X)$]—, where X is alkylOC(O)—. Acrylic emulsions have found applications in water-borne coatings. The acrylic emulsions can include dispersions of acrylic monomers with a cross-linking catalyst; acrylic copolymers which are capable of self-crosslinking; styrene acrylic copolymers; or functionalized acrylic copolymers.

In some optional implementations, the material can be or includes an acrylic material in a water-based carrier. In such implementations, the acrylic material can be methyl methacrylate based, butyl acrylate based, ethyl acrylate based, or their mixtures. In such implementations, an polycarbodiimide, an aziridine, or an imidazoline material can serve as an external crosslinking material. In such implementations, the acrylic coating can be formulated as a one or a two component system.

Vinylic Polymers

Aqueous dispersions of the acrylic vinylic copolymers form the core material of this type of formulations. The copolymerization of the polyvinyl acetate with ethylene provides varying flexibility and transparency required in many coatings. Polyvinyl acetate has the repeating units of ethylene substituted by acetoxy groups: —[$CH_2$—CH(X)]—, where X is $CH_3$C(O)O—, an acetate. Polyethylene has the repeating units of ethylene: —[$CH_2$—$CH_2$]—. In some implementations, the material can be or includes an vinyl resin material in a water-based carrier. In such implementations, the vinylic material can be polyvinyl acetate, polyvinyl acetate-ethylene copolymer, polyvinyl alcohol (—[$CH_2$—CH(X)]—, where X is OH) or a thio functionalized vinylic copolymer. In such implementations, the material can be a one component system.

Hybrid Systems

Some or all of the formulation systems mentioned above may be combined together to form a hybrid system. The hybrid systems can either be a hybrid copolymer system in a homogeneous medium or a hybrid dispersion. Hybrid dispersions contain two chemical classes which interact cooperatively to provide desired properties, typically in a water-based carrier. In some implementations, the material can be a one or a two component hybrid material in a water-based carrier. In such implementations, the hybrid material can be a combination of polyurethane/acrylic, epoxy/acrylic, alkyd/acrylic, or polyvinyl alcohols. In such implementations, an external crosslinker can include an polycarbodiimide, an aziridine, or an imidazoline.

In some implementations, the material can be a one component hybrid material in a water-based carrier. In such implementations, the hybrid material can be a combination of polyurethane dispersion (PUD)/acrylic, polyvinyl acetate/acrylic, polyvinyl acetate/epoxy, polyvinyl acetate/polyurethane, or polyvinyl alcohols. In such implementations, an external crosslinker can include an polycarbodiimide, an aziridine, or an imidazoline.

Polyols

An acrylic polyol is an example of a polyol that can be reacted with the reactive groups such as isocyanates, epoxides and other such reactive groups to produce the coatings. Acrylic polyols can be typically obtained by polymerization (free-radical mediated) of hydroxyacrylates and styrene. Examples of hydroxyacrylates include butanediol monoacrylate (BDMA), 2-hydroxyethyl acrylate (HEA), 2-hydroxypropyl acrylate (HPA), hydroxybutyl acrylate, polycaprolactone modified hydroxyethyl hexylacrylate. In some implementations, the percentage weight of acrylic polyol in the total material formulation can be about 16%, e.g., about 12%, about 13%, about 14%, about 15%, about 17%, or even about 18%. In some implementations, the percentage weight of acrylic polyol in the total material formulation can be from about 10% to about 20%, e.g., from about 11% to about 19%, from about 12% to about 18%, from about 13% to about 17%, or from about 14% to about 16%.

A polyoxyalkylene diol is an example of another polyol that can be used to produce the coatings. In some implementations, the polyoxyalkylene diols have a number average molecular weight of from about 200 to 3,000, e.g., from about 500 to about 2,000, as determined using narrow disperse polyethylene glycol standards. Specific examples of polyoxyalkylene diols include polyethyleneether glycol, polypropyleneether glycol, polybutyleneether glycol, polytetramethyleneether glycol, and copolymers of polypropyleneether and polyethyleneether glycols. Mixtures of any of the polyoxyalkylene diols can also be used.

Polyester polyols or polyester diols are polyesters having terminal hydroxyl groups and are examples of polyols that can be used to produce the coatings. Such polyester diols can be prepared by the condensation of a diol, such as ethylene glycol, propanediol-1,2, propanediol-1,3, butanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, or mixtures of these diols, with a dicarboxylic acid or an equivalent thereof, e.g., acid halide or anhydride. Examples of acids include oxalic, malonic, succinic, glutaric, adipic, pimelic, suberic, azelaic, terephthalic, sebacic, malic, phthalic, cylohexanedicarboxylic or mixtures of these acids. When preparing these polyester diols, generally an excess of the diol over dicarboxylic acid is used.

Polyamide diols or polyamide polyols having terminal hydroxyl groups are yet another example of a polyol that can be used to produce the coatings.

Polyamine polyols having terminal hydroxyl groups are yet another example of a polyol that can be used to produce the coatings.

Polyepoxy polyol having terminal hydroxyl groups are yet another example of a polyol that can be used to produce the coatings.

Polyvinyl polyol having terminal hydroxyl groups are yet another example of a polyol that can be used to produce the coatings.

A polyurethane diol, having terminal hydroxyl groups is yet another example of a polyol that can be used to produce the coatings. The polyurethane diols can include polyalkylene, poly(oxyalkylene), polyester, polyamide, polycarbonate, polysulfide, polyacrylate, polymethacrylate, or mixtures of any of these functionalities along its backbone. In some implementations, the polyurethane diols have a number average molecular weight of from about 200 to 3,000, e.g., from about 500 to about 2,000, as determined using narrow disperse polyethylene glycol standards. Polyurethane diols can be advantageously utilized to provide particularly wear and scratch resistant coatings. The polyurethane having terminal hydroxyl groups can be prepared by a reaction of any one or more of the polyols discussed above and an organic diisocyanate to provide a isocyanate terminated prepolymer, followed by reaction of the prepolymer with a polyhydric alcohol containing 2-6 hydroxyl groups. Some polyurethane diols are commercially available from Sigma-Aldrich chemicals or King industries.

The diol can be reacted with the diisocyanate utilizing a molar ratio of about 1:2, respectively, in the presence of an activator (or accelerator) such as oxazolidine or an organotin compound, e.g., dibutyltin dilaurate or dibutyltin dioctoate. The reaction can be allowed to proceed at a temperature of from about 60° C. to about 180° C., from about 4 hours to about 24 hours to provide the isocyanate terminated prepolymer.

The isocyanate terminated urethane prepolymer can then be reacted, e.g., at from about 60° C. to about 110° C. for 1 to about 10 hours, with a monomeric, polyhydric alcohol containing 2-6 hydroxyl groups in a molar ratio of 1:2, respectively. Examples of alcohols that can be used include 1,4-cyclohexane dimethanol, 1,4-butanediol, mannitol, trimethylol propane, trimethylol ethane, 1,1-cyclohexane dimethanol, hydrogenated bisphenol A, cyclohexane diol, neopentyl glycol, trimethylpentanediol, pentaerythritol, and trimethylhexanediol. The result of treating the isocyanate terminated urethane prepolymer with the one or more alcohols is a polyurethane diol having 2-10 terminal hydroxyl groups and no isocyanates groups.

Polyurethane diols can also be made by reacting organic carbonates with amines.

In some implementations in which a polyurethane diol is used to make the coating, the molar proportion of polyurethane diol to the alkoxyalkylamino material can range from about 10:1 to about 1:1, e.g., 5:1 to 1:1.

Examples of commercial polyols include, but are not limited to, Desmophen® (available from Bayer), Macrynal® (available from Cytec Industries), and Arolon® (available from Reichold).

In some implementations, the material can include an external crosslinker, such as a polycarbodiimide, an aziridine, or an imidazoline.

Other Implementations:

In some optional implementations, the material can be or includes a reaction product of a first component that includes an alkoxyalkylamino material in a water-based carrier and a second component that includes a polyol in a water-based carrier. In such implementations, the alkoxyalkylamino material can serve as a crosslinking material.

In yet other optional implementations, the material can be or includes an alkyd material in a water-based carrier. In such implementations, the oil part of the material can be castor oil, soybean oil, sunflower oil, soya oil, linseed oil, or their mixtures. In such implementations, the material can be a one or a two component system.

In yet other optional implementations, the material can be selected from fluorine based resins or silica based resins. In such implementations, the material can be a one or a two component system.

In yet other optional implementations, the material can be selected from a rosin phenolic, an epoxy ester, polyurea, polyaspartics, or adipic dihydrazine based. In such implementations, the material can be a two component system.

Solvents

The coating 14 can be formed from a material in a water-based carrier. While not intending to be bound by theory, it is believed that solvents can be effective as a dispersive vehicle for the pigments and resins in a coating formulation prior to curing. During the application of the formulation, they aid in achieving an appropriate viscosity of the formulation. However, after the coating has been cured, it can be expected that there is no residual solvent. The solvents can include 2-butoxyethanol, ethylene glycol, ethyl benzene, xylenes, methyl amyl ketone, isopropyl alcohol, propylene glycol monomethyl ether, ethylene glycol monobutyl ether, butanol, paraffins, alkanes, polypropylene glycol, Stoddard solvent, toluene, ethoxylated alkylphenol, 1-methyl-2-pyrrolidinone, or 1-ethylpyrrolidin-2-one.

Other Modifying Agents in the Formulations

Accelerators that can be used in the formulation include catalysts such as dibutyltin dialkanoate (e.g., dibutyltin dilaurate, dibutyltin dioctoate), and oxazolidine. Acid promoters include sulfonic acids, e.g., aryl, alkyl, and aralkyl sulfonic acids; aryl, alkyl, and aralkyl phosphoric and phosphonic acids; aryl, alkyl, and aralkyl acid pyrophosphates; carboxylic acids; sulfonimides; mineral acids and mixtures thereof. In some implementations, phosphoric acid can be utilized. Examples of sulfonic acids include benzenesulfonic acid, para-toluenesulfonic acid, dodecylbenzenesulfonic acid, and naphthalenesulfonic acid. Examples of aryl, alkyl, and aralkyl phosphates and pyrophosphates include phenyl, para-tolyl, methyl ethyl, benzyl, diphenyl, di-para-tolyl, di-methyl, di-ethyl, di-benzyl, phenyl-para-tolyl, methyl-ethyl, phenyl-benzyl phosphates and pyrophosphates. Examples of carboxylic acids include benzoic acid, formic acid, acetic acid, propionic acid, butyric acid, dicarboxylic acids such as oxalic acid, and fluorinated acids such as trifluoroacetic acid. Examples of sulfonimides include dibenzene sulfonimide, di-para-toluene sulfonimide, methyl-para-toluene sulfonimide, and dimethyl sulfonamide. Examples of mineral acids include nitric acid, sulfuric acid and hydrochloric acid.

The curable compositions can also contain other optional ingredients such as fillers, surfactants, light stabilizers, pigments, opacifying agents, defoaming agent, surface gloss-modifying agent, biocides, a viscosity-modifying agent, dispersing agents, reactive diluents, extender pigments, inhibitors for corrosion or efflorescence, flame retardants, intumescent agents, thermal agents for energy efficiency, additives for protection from UV and/or IR, self-cleaning agents, perfumes, or odor sustaining agents.

Several commercial suitable light stabilizers are available from CIBA Specialty Chemicals under the trade names Tinuvin® (benzotriazole, triazine, or hindered amine based) and Chimassorb® (benzophenone based).

Examples of opacifying agents zinc oxide, titanium dioxide, silicon dioxide, Kaolin clay, e.g., high whiteness Kaolin clay, or mixtures thereof.

Examples of defoaming agents include polyethylene glycols, or silicone surfactants, e.g., polyether modified polydimethyl siloxane. Defoaming agents such as BYK family of agents are available from BYK-Chemie GmbH.

Examples of viscosity modifying agents include polyurethanes, or Tafigel®, a commercial acrylic copolymer available from Munzing Chemie GmbH.

Certain implementations are further described in the following examples, which are not intended to limit the scope of the disclosure.

EXAMPLES

Example 1

First Component

During the grind stage, to the pot were added, in order, in the ranges of weight % listed in Table 1: oxirane-modified fatty acid ester, Stoddard solvent, butyl glycolate, 2-butoxyethanol, alkylaryl alkoxylate, ester/styrene maleic anhydride copolymer, ethylene glycol, 2,4,7,9-tetramethyl-5-decyne-4,7-diol, ethyl benzene and xylene (mixed isomers). The contents were then mixed at slow speeds until fully dispersed. The speed was maintained at no more than 100-200 rpm. Titanium dioxide, aluminum hydroxide, amorphous silica and water were then added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, propylene glycol monomethyl ether, methyl amyl ketone and isopropyl alcohol were added to the grind mixture. The speed was maintained to mix the material. After 15-20 minutes the product was packaged.

Second Component

The high acid value polyester, ethylene glycol monobutyl ether and isopropyl alcohol mixture was the second component of the final product. No mixing was required for these materials.

Combining the First and Second Components

The first and second components were combined, when desired, to obtain the final coating formulation. The combination had a pot life of a maximum of about 1 hour during which time the application was completed. The composition of the formulation is described in Table 1.

TABLE 1

Epoxy and alcohol based formulation

| Component | range % by wt on total formula |
| --- | --- |
| oxirane-modified fatty acid ester | 17-20 |
| stoddard solvent | 0.10-0.14 |
| butylglycolate | 0.005-0.02 |
| 2-butoxyethanol | 0.001-0.006 |
| alkylarylalkoxylate | 0.02-0.13 |
| ester/styrene maleic anhydride copolymer | 0.01-0.10 |
| ethylene glycol | 0.01-0.03 |
| 2,4,7,9-tetramethyl-5-decyne-4,7-diol | 0.01-0.03 |
| ethyl benzene | 0.04-0.07 |
| xylenes | 0.4-0.6 |
| titanium dioxide | 13-15 |
| aluminum hydroxide | 1-3 |
| amorphous silica | 1-3 |
| water | 4-6 |
| propylene glycol monomethyl ether | 1-3 |
| methyl amyl ketone | 5-7 |
| isopropyl alcohol | 3-6 |
| high acid value polyester | 20-23 |
| ethylene glycol monobutyl ether | 4-6 |
| isopropyl alcohol | 4-6 |

Example 2

First Component

During the grind stage, to the pot were added, in order, in the ranges of weight % listed in Table 2: water, polyetherpolysiloxane, polyalkylene oxide, alkylarylalkoxylate, ester/styrene maleic anhydride copolymer, ethylene glycol, 2,4,7,9-tetramethyl-5-decyne-4,7-diol, 2-butoxyethanol, polypropylene glycol and polysiloxanes. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, methyl benzimidazole-2-yl carbamate, Koalin, 3-iodo-2-propynyl butyl carbamate, synthetic fatty acids modified acrylic copolymer and butanol, were added to the grind mixture. The speed was maintained to mix the material. After 15-20 minutes the product was packaged.

Second Component

The mixture of N,N-dimethylcyclohexylamine, hexamethylene-1,6-diisocyanate and hydrophilic aliphatic polyisocyanate based on hexamethylene diisocyanate was the second component of the final product. No mixing was required for these materials.

Combining the First and Second Components

The first and second components were combined, when desired, to obtain the final coating formulation. The combination had a pot life of a maximum of about 1 hour during which time the application was completed. The composition of the formulation is described in Table 2.

TABLE 2

Isocyanate with acrylic polyol based formulation

| Component | Range % by wt on total formula |
| --- | --- |
| water | 19-24 |
| polyetherpolysiloxane | 0.008-0.012 |
| polyalkylene oxide | 0.004-0.006 |
| alkylarylalkoxylate | 0.12-0.36 |
| ester/styrene maleic anhydride copolymer | 0.15-0.40 |
| ethylene glycol | 0.04-0.12 |
| 2,4,7,9-tetramethyl-5-decyne-4,7-diol | 0.04-0.08 |
| 2-butoxyethanol | 0.006-0.010 |
| polypropylene glycol | 0.90-1.00 |
| polysiloxanes | 0.036-0.041 |
| titanium dioxide | 21-23 |
| aluminum hydroxide | 1-3 |
| amorphous silica | 1-3 |
| methyl benzimidazole-2-yl carbamate | 0.07-0.09 |
| koalin | 0.07-0.09 |
| 3-iodo-2-propynyl butyl carbamate | 0.03-0.05 |
| synthetic fatty acids modified acrylic copolymer | 23-29 |
| butanol | 1.9-2.1 |
| N,N-dimethylcyclohexylamine | 1.5-1.7 |
| hexamethylene-1,6-diisocyanate | 0.17-0.19 |
| hydrophilic aliphatic polyisocyanate based on hexamethylene diisocyanate | 32-36 |

Example 3

First Component

During the grind stage, to the pot were added, in order, in the ranges of weight % listed in Table 3: water, polyetherpolysiloxane, polyalkylene oxide, alkylarylalkoxylate, ester/styrene maleic anhydride copolymer, ethylene glycol, 2,4,7,9-tetramethyl-5-decyne-4,7-diol, 2-butoxyethanol, polypropylene glycol and polysiloxanes. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, 2-amino-2-methyl-1-propanol, 2-(methylamino)-2-methyl-1-propanol, methyl benzimidazole-2-yl carbamate, Koalin and 3-iodo-2-propynyl butyl carbamate were added to the grind mixture. After less than 5-10 minutes, synthetic fatty acids modified acrylic copolymer and butanol were added to the pot. The speed was maintained to mix the material. After 15-20 minutes the product was packaged.

Second Component

The mixture of homopolymer of hexane-1,6-diisocyanate, n-butyl acetate, polyoxyethylene tridecyl ether phosphate, N,N-dimethyl-cyclohexanamine, 1,6-diisocyanato-hexane and isophorone diisocyanate was the second component of the final product. No mixing was required for these materials.

Combining the First and Second Components

The first and second components were combined, when desired, to obtain the final coating formulation. The combination had a pot life of a maximum of about 1 hour during which time the application was completed. The composition of the formulation is described in Table 3.

TABLE 3

Isocyanate based formulation containing IPDI

| Component | Range % by wt on total formula |
|---|---|
| water | 19-24 |
| polyetherpolysiloxane | 0.008-0.012 |
| polyalkylene oxide | 0.004-0.006 |
| alkylarylalkoxylate | 0.12-0.36 |
| ester/styrene maleic anhydride copolymer | 0.15-0.40 |
| ethylene glycol | 0.04-0.12 |
| 2,4,7,9-tetramethyl-5-decyne-4,7-diol | 0.04-0.08 |
| 2-butoxyethanol | 0.006-0.010 |
| polypropylene glycol | 0.90-1.00 |
| polysiloxanes | 0.036-0.041 |
| titanium dioxide | 21-23 |
| aluminum hydroxide | 1-3 |
| amorphous silica | 1-3 |
| 2-amino-2-methyl-1-propanol | 0.05-0.07 |
| 2-(methylamino)-2-methyl-1-propanol | 0.003-0.005 |
| methyl benzimidazole-2-yl carbamate | 0.07-0.09 |
| koalin | 0.07-0.09 |
| 3-iodo-2-propynyl butyl carbamate | 0.03-0.05 |
| synthetic fatty acids modified acrylic copolymer | 23-29 |
| butanol | 1.9-2.1 |
| 1,6-diisocyanato-hexane, homopolymer | 16-18 |
| n-butyl acetate | 4.5-7.5 |
| polyoxyethylene tridecyl ether phosphate | 2-4 |
| N,N-dimethyl-cyclohexanamine | 0.65-0.75 |
| 1,6-diisocyanato-hexane | 0.08-0.09 |
| isophorone diisocyanate | 0.08-0.09 |

Example 4

First Component

During the grind stage, to the pot were added, in order, in the ranges of weight % listed in Table 4: water, poly amine adduct, tetraethylenepentamine, a mixture of polymers and hydrophobic polymers, 2-ethyl-1hexanol, paraffins, and modified polyacrylate. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, alkanes, 2-butoxyethanol and ethoxylated alkylphenol were added to the grind mixture. The speed was maintained to mix the material. After less than 5-10 minutes, acrylic nonionic copolymer and 2-methoxymethylethoxy-propanol were added to the pot. The speed was maintained to mix the material. After less than 5-10 minutes, solution of modified urea, 1-methyl-2-pyrrolidone and lithium chloride were added to the pot. The speed was maintained to mix the material. After less than 5-10 minutes, polysiloxane and polyethylene glycol were added to the pot. The speed was maintained to mix the material. After 15-20 minutes the product was packaged.

Second Component

The diglycidyl ether of bisphenol-A homopolymer mixture was the second component of the final product. No mixing was required for these materials.

Combining the First and Second Components

The first and second components were combined, when desired, to obtain the final coating formulation. The combination had a pot life of a maximum of about 1-2 hours during which time the application was completed. The composition of the formulation is described in Table 4.

TABLE 4

Epoxy and amine based formulation

| Component | Range % by wt on total formula |
|---|---|
| water | 27-32 |
| poly amine adduct | 6-7 |
| tetraethylenepentamine | 0.40-1.00 |
| mixture of polymers and hydrophobic polymers | 0.018-0.021 |
| 2-ethyl-1-hexanol | 0.0015-0.0025 |
| paraffins | 0.040-0.050 |
| modified polyacrylate | 0.01-0.50 |
| titanium dioxide | 12-16 |
| aluminum hydroxide | 1-2 |
| amorphous silica | 1-2 |
| alkanes | 0.48-0.80 |
| 2-butoxyethanol | 0.040-0.085 |
| ethoxylated alkylphenol | 0.008-0.041 |
| acrylic nonionic copolymer | 0.11-0.13 |
| 2-methoxymethylethoxy-propanol | 0.07-0.14 |
| modified urea | 0.035-0.038 |
| 1-methyl-2-pyrrolidone | 0.020-0.045 |
| lithium chloride | 0.0005-0.0010 |
| polysiloxane | 0.01-0.10 |
| polyethylene glycol | 0.01-0.10 |
| diglycidyl ether of bisphenol-A homopolymer | 49-51 |

Example 5

First Component

During the grind stage, to the pot were added, in order, in the ranges of weight % listed in Table 5: water, xylene, polypropylene glycol, polysiloxanes, functionalized polyacrylate copolymer, alkanes, 2-butoxyethanol and ethoxylated alkylphenol. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, 2-amino-2-methyl-1-propanol and 2-(methylamino)-2-methyl-1-propanol were added to the grind mixture. After less than 5-10 minutes, N,N-diethylethanamine, polyurethane resin and 1-methyl-2-pyrrolidinone were added to the pot. The speed was maintained to mix the material. After less than 5-10 minutes, fluoroaliphatic polymeric esters+(5049P), residual organic fluorochemicals, toulene and fluorochemical monomers were added to the pot. The speed was maintained to mix the material. After less than 5-10 minutes polyurethane resin was added to the pot. After less than 5-10 minutes, polyurethane resin was added to the pot. The speed was maintained to mix the material. After 15-20 minutes the product packaged.

Second Component

The polyfunctional aziridine mixture was the second component of the final product. No mixing was required for these materials.

Combining the First and Second Components

The first and second components were combined, when desired, to obtain the final coating formulation. The combination had a pot life of a maximum of about 1 hour during which time the application was completed. The composition of the formulation is described in Table 5.

TABLE 5

Polyurethane based formulation

| Component | Range % by wt on total formula |
| --- | --- |
| water | 55-60 |
| xylene | 0.0025-0.0035 |
| polypropylene glycol | 0.14-0.29 |
| polysiloxanes | 0.54-0.56 |
| functionalized polyacrylate copolymer | 0.25-0.26 |
| alkanes | 0.11-0.19 |
| 2-butoxyethanol | 1.49-1.54 |
| ethoxylated alkylphenol | 0.002-0.010 |
| titanium dioxide | 19-24 |
| aluminum hydroxide | 1-2 |
| amorphous silica | 1-3 |

TABLE 5-continued

Polyurethane based formulation

| Component | Range % by wt on total formula |
| --- | --- |
| 2-amino-2-methyl-1-propanol | 0.15-0.17 |
| 2-(methylamino)-2-methyl-1-propanol | 0.08-0.010 |
| N,N-diethylethanamine | 0.40-1.00 |
| polyurethane resin | 13-15 |
| 1-methyl-2-pyrrolidinone | 7-8 |
| fluoroaliphatic polymeric esters + (5049p) | 0.13-0.15 |
| residual organic fluorochemicals | 0.0040-0.0045 |
| toluene | 0.0020-0.0025 |
| fluorochemical monomer | 0.0015-0.0020 |
| polyurethane resin | 0.09-0.010 |
| polyurethane resin | 0.39-0.44 |
| polyfunctional aziridine | 0.64-0.67 |

Example 6

During the grind stage, to the pot were added, in order, in the ranges of weight % listed in Table 6: water, propylene glycol, xylene, polypropylene glycol, polysiloxanes, polycarboxylate-sodium salt, alkanes, 2-butoxyethanol and ethoxylated alkylphenol. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, vinyl acetate/ethylene copolymer was added to the grind mixture. After less than 5-10 minutes, 2,2,4-trimethyl-1,3-pentanediol monoisobutyrate was added to the pot. The speed was maintained to mix the material. After less than 5-10 minutes, polyurethane resins and enzymatically modified starch were added to the pot. The speed was maintained to mix the material. After 15-20 minutes the product was packaged. The composition of the formulation is described in Table 6.

TABLE 6

Vinyl acetate-ethylene based formulation

| Component | Range % by wt on total formula |
| --- | --- |
| water | 44-54 |
| propylene glycol | 0.60-0.70 |
| xylene | 0.02-0.03 |
| polypropylene glycol | 1.00-2.00 |
| polysiloxanes | 0.30-0.40 |
| polycarboxylate, sodium salt | 0.42-0.47 |
| alkanes | 0.74-1.23 |
| 2-butoxyethanol | 0.06-0.12 |
| ethoxylated alkylphenol | 0.01-0.06 |
| titanium dioxide | 24-30 |
| aluminum hydroxide | 1-3 |
| amorphous silica | 1-4 |
| vinyl acetate/ethylene copolymer | 17-25 |
| 2,2,4-trimethyl-1,3-pentanediol monoisobutyrate | 1-2 |

TABLE 6-continued

Vinyl acetate-ethylene based formulation

| Component | Range % by wt on total formula |
|---|---|
| polyurethane resin | 0.29-0.36 |
| polyurethane resin | 0.16-0.20 |
| enzymatically modified starch | 0.04-0.06 |

Example 7

During the grind stage, to the pot were added, in order, in the ranges of weight % listed in Table 7: water, N,N-diethylethanamine, polyurethane resin, 1-methyl-2-pyrrolidinone, alkanes, 2-butoxyethanol and ethoxylated alkylphenol. The contents were then mixed at slow speeds until fully dispersed. The speed was maintained at no more than 200-400 rpm. There was no Hegman grind to measure in this formula. Once blending was achieved, mixing speed was reduced until the pot was just mixing the raw materials and continued for 10-15 minutes. The speed was maintained to mix the material. After 15-20 minutes the product was packaged. The composition of the formulation is described in Table 7.

TABLE 7

Polyurethane (oil modified) based formulation

| Component | Range % by wt on total formula |
|---|---|
| water | 63-65 |
| N,N-diethylethanamine | 1-2 |
| polyurethane resin | 29-30 |
| 1-methyl-2-pyrrolidinone | 3.8-5.7 |
| alkanes | 0.60-1.00 |
| 2-butoxyethanol | 0.05-0.10 |
| ethoxylated alkylphenol | 0.01-0.05 |

Example 8

During the grind stage, to the pot were added, in order, in the ranges of weight % listed in Table 8: water, chloro-2-methyl-4-isothiazolin-3-one, 2-methyl-4-isothiazolin-3-one, magnesium chloride, magnesium nitrate, polycarboxylate-sodium salt, ammonium hydroxide, α-(phenylmethyl)-ω-(1,1,3,3,-tetramethylbutyl)phenoxy poly(oxy-1-2-ethanediyl), mono{(1,1,3,3-tetramethylbutyl)phenyl}ether polyethylene glycols, xylene and polysiloxanes. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until a maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, acrylic monomers were added to the grind mixture. After less than 5-10 minutes, 2,2,4-trimethyl-1,3-pentanediol monoisobutyrate was added to the pot. The speed was maintained to mix the material. After less than 5-10 minutes, polyurethane resin and 2-butoxyethanol were added to the pot. The speed was maintained to mix the material. After less than 5-10 minutes polyethylene glycol octylphenyl ether and poly(ethylene oxide) were added to the pot. The speed was maintained to mix the material. After less than 5-10 minutes, propylene glycol was added to the pot. The speed was maintained to mix the material. After less than 5-10 minutes, polyurethane resin was added to the pot. The speed was maintained to mix the material. After 15-20 minutes the product was packaged. The composition of the formulation is described in Table 8.

TABLE 8

Acrylic emulsion based formulation

| Component | Range % by wt on total formula |
|---|---|
| Water | 53-60 |
| chloro-2-methyl-4-isothiazolin-3-one | 0.00016-0.00020 |
| 2-methyl-4-isothiazolin-3-one | 0.0004-0.0007 |
| magnesium chloride | 0.001-0.002 |
| magnesium nitrate | 0.002-0.003 |
| polycarboxylate, sodium salt | 0.11-0.14 |
| ammonium hydroxide | 0.025-0.028 |
| α-(phenylmethyl)-ω-(1,1,3,3,-tetramethylbutyl)phenoxy-poly(oxy-1-2-ethanediyl) | 0.080-0.084 |
| polyethylene glycols, mono{(1,1,3,3-tetramethylbutyl)phenyl}ether | 0.013-0.015 |
| Xylene | 0.1-0.2 |
| Polysiloxanes | 0.015-0.025 |
| titanium dioxide | 17-21 |
| aluminum hydroxide | 1-2 |
| amorphous silica | 1-3 |
| acrylic monomers | 24-27 |
| 2,2,4-trimethyl-1,3-pentanediol monoisobutyrate | 0.74-0.77 |
| polyurethane resin | 0.55-0.61 |
| 2-butoxyethanol | 0.26-0.32 |
| Polypropylene glycol | 0.10-0.20 |
| polyethylene glycol octylphenyl ether | 0.40-0.43 |
| poly(ethylene oxide) | 0.010-0.014 |
| propylene glycol | 0.55-0.59 |
| polyurethane resin | 0.055-0.065 |

Example 9

During the grind stage, to the pot were added, in order, in the ranges of weight % listed in Table 9: water, xylene, polypropylene glycol, polysiloxanes, functionalized polyacrylate copolymer, alkanes, 2-butoxyethanol and ethoxylated alkylphenol. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, 2-amino-2-methyl-1-propanol and 2-(methylamino)-2-methyl-1-propanol were added to the grind mixture. After less than 5-10 minutes, N,N-diethylethanamine, polyurethane resin and 1-methyl-2-pyrrolidinone were added to the pot. The speed was maintained to mix the material. After less than 5-10 minutes, fluoroaliphatic polymeric esters+(5049P), residual organic fluorochemicals, toluene and fluorochemical monomer were added to the pot. The speed was maintained to mix the material. After less than 5-10 minutes polyurethane resin was added to the pot. The speed was maintained to mix the material. After less than 5-10 minutes, polyurethane resin was added to the pot. The speed was maintained to mix the material. After 15-20 minutes the product packaged. Pot life on the mixture was greater than 4 hours but less than 24 hours. The composition of the formulation is described in Table 9.

TABLE 9

Polyurethane based formulation

| Component | Range % by wt on total formula |
| --- | --- |
| Water | 55-60 |
| Xylene | 0.0025-0.0035 |
| polypropylene glycol | 0.14-0.29 |
| Polysiloxanes | 0.54-0.56 |
| functionalized polyacrylate copolymer | 0.25-0.26 |
| alkanes | 0.11-0.19 |
| 2-butoxyethanol | 1.49-1.54 |
| ethoxylated alkylphenol | 0.002-0.010 |
| titanium dioxide | 19-24 |
| aluminum hydroxide | 1-2 |
| amorphous silica | 1-3 |
| 2-amino-2-methyl-1-propanol | 0.15-0.17 |
| 2-(methylamino)-2-methyl-1-propanol | 0.08-0.010 |
| N,N-diethylethanamine | 0.40-1.00 |
| polyurethane resin | 13-15 |
| 1-methyl-2-pyrrolidinone | 7-8 |
| fluoroaliphatic polymeric esters + (5049p) | 0.13-0.15 |
| residual organic fluorochemicals | 0.0040-0.0045 |
| toluene | 0.0020-0.0025 |
| fluorochemical monomer | 0.0015-0.0020 |
| polyurethane resin | 0.09-0.010 |
| polyurethane resin | 0.39-0.44 |

Example 10

During the grind stage, to the pot were added, in order, in the ranges of weight % listed in Table 10: water, polyurethane dispersion, benzyl benzoate, dipropylene glycol butyl ether, tri-n-butyl citrate and propylene glycol. The contents were then mixed at slow speeds until fully dispersed. The speed was maintained at no more than 200-400 rpm. There was no Hegman grind to measure in this formula. Once blending was achieved, mixing speed was reduced until the pot was just mixing the raw materials and continued for 10-15 minutes.

During the letdown stage, 2,4,7,9-tetramethyl-5-decyne-4,7-diol, and ethylene glycol were added to the pot. The speed was maintained to mix the material. After less than 5-10 minutes, an emulsion of organo-modified polysiloxanes and α-octadecyl-ω-hydroxy poly(oxy-1,2-ethanediyl), was added to the pot. The speed was maintained to mix the material. After less than 5-10 minutes, nonionic polyethylene wax was added to the pot. The speed was maintained to mix the material. After 15-20 minutes the product was packaged. The composition of the formulation is described in Table 10.

TABLE 10

Polyurethane dispersion based formulation

| Component | Range % by wt on total formula |
| --- | --- |
| Water | 15-22 |
| polyurethane resin | 68-75 |
| benzyl benzoate | 1-3 |
| dipropylene glycol butyl ether | 5-7 |
| tri-n-butyl citrate | 0.73-0.76 |
| propylene glycol | 0.90-1.00 |
| 2,4,7,9-tetramethyl-5-decyne-4,7-diol | 1-1.1 |
| ethylene glycol | 0.34-0.37 |
| emulsion of organo-modified polysiloxanes | 0.20-0.22 |
| α-octadecyl-ω-hydroxy poly(oxy-1,2-ethanediyl) | 0.002-0.010 |
| nonionic polyethylene wax | 0.65-0.68 |

Example 11

During the grind stage, to the pot were added, in order, in the ranges of weight % listed in Table 11: water, propylene glycol, polypropylene glycol, polysiloxanes, polycarboxylate-sodium salt, alkanes, 2-butoxyethanol and ethoxylated alkylphenol. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, polyurethane/acrylic mixture, 1-ethylpyrrolidin-2-one and 2-(2-butoxyethoxy) ethanol were added to the grind mixture. The speed was maintained to mix the material. After less than 5-10 minutes, benzoate esters were added to the pot. The speed was maintained to mix the material. After less than 5-10 minutes, polyurethane resin was added to the pot. The speed was maintained to mix the material. After less than 5-10 minutes, polyurethane resin and enzymatically modified starch were added to the pot. The speed was maintained to mix the material. After 15-20 minutes the product was packaged. The composition of the formulation is described in Table 11.

TABLE 11

Hybrid polyurethane-acrylic dispersion based formulation

| Component | Range % by wt on total formula |
| --- | --- |
| water | 52-60 |
| propylene glycol | 0.48-0.50 |
| polypropylene glycol | 0.72-1.45 |
| polysiloxanes | 0.056-0.060 |
| polycarboxylate, sodium salt | 0.33-0.36 |
| alkanes | 0.56-1.00 |
| 2-butoxyethanol | 0.04-0.10 |
| ethoxylated alkylphenol | 0.01-0.05 |
| titanium dioxide | 19-24 |
| aluminum hydroxide | 1-2.5 |
| amorphous silica | 1-2.5 |

TABLE 11-continued

Hybrid polyurethane-acrylic dispersion based formulation

| Component | Range % by wt on total formula |
|---|---|
| polyurethane/acrylic mixture | 18-20 |
| 1-ethylpyrrolidin-2-one | 0.48-2.5 |
| 2-(2-butoxyethoxy) ethanol | 0.48-2.5 |
| benzoate esters | 0.95-1.00 |
| polyurethane resin | 0.23-0.26 |
| polyurethane resin | 0.13-0.16 |
| enzymatically modified starch | 0.028-0.049 |

Example 12

During the grind stage, to the pot were added, in order, in the ranges of weight % listed in Table 12: water, propylene glycol, xylene, polypropylene glycol, polysiloxanes, polycarboxylate-sodium salt, alkanes, 2-butoxyethanol and ethoxylated alkylphenol. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, acrylic copolymer emulsion was added to the grind mixture. The speed was maintained to mix the material. After less than 5-10 minutes, 2,2,4-trimethyl-1,3-pentanediol monoisobutyrate was added to the pot. The speed was maintained to mix the material. After less than 5-10 minutes, polyurethane resin was added to the pot. The speed was maintained to mix the material. After less than 5-10 minutes, polyurethane resin and enzymatically modified starch were added to the pot. The speed was maintained to mix the material. After 15-20 minutes the product was packaged. The composition of the formulation is described in Table 12.

TABLE 12

Acrylic based formulation

| Component | Range % by wt on total formula |
|---|---|
| water | 50-57 |
| propylene glycol | 0.60-0.63 |
| xylene | 0.018-0.022 |
| polypropylene glycol | 0.91-1.90 |
| polysiloxanes | 0.33-0.37 |
| polycarboxylate, sodium salt | 0.42-0.47 |
| alkanes | 0.73-1.25 |
| 2-butoxyethanol | 0.06-0.13 |
| ethoxylated alkylphenol | 0.012-0.06 |
| titanium dioxide | 24-31 |
| aluminum hydroxide | 1-3 |
| amorphous silica | 1-3 |
| acrylic copolymer emulsion | 17.0-19.5 |
| 2,2,4-trimethyl-1,3-pentanediol monoisobutyrate | 1.20-1.30 |
| polyurethane resin | 0.29-0.33 |

TABLE 12-continued

Acrylic based formulation

| Component | Range % by wt on total formula |
|---|---|
| polyurethane resin | 0.17-0.20 |
| enzymatically modified starch | 0.03-0.07 |

Example 13

During the grind stage, to the pot were added, in order, in the ranges of weight % listed in Table 13: water, xylene, polypropylene glycol, polysiloxanes, and functionalized polyacrylate copolymers. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, the speed was increased to achieve sufficient vortex. A sufficient RPM was maintained while keeping the temperature in the pot below 95-110° F. Hegman at this point was at least a 7. Once Hegman was achieved, mixing speed was reduced until the pot was just mixing the raw materials and continued for 10-15 minutes.

During the letdown stage, 2-amino-2-methyl-1-propanol and 2-(methylamino)-2-methyl-1-propanol were added to the grind mixture. The speed was maintained to mix the material. After less than 5-10 minutes, epoxy based styrene-acrylic copolymer was added to the pot. The speed was maintained to mix the material. After less than 5-10 minutes, dipropylene glycol monomethyl ether was added to the pot. The speed was maintained to mix the material. After less than 5-10 minutes, 2,2,4-trimethyl-1,3-pentanediol monoisobutyrate was added to the pot. The speed was maintained to mix the material. After less than 5-10 minutes, polyurethane resin was added to the pot. The speed was maintained to mix the material. After less than 5-10 minutes, polyurethane resin and 2-butoxyethanol were added to the pot. The speed was maintained to mix the material. After 15-20 minutes the product was packaged. The composition of the formulation is described in Table 13.

TABLE 13

Epoxy-acrylic based formulation

| Component | Range % by wt on total formula |
|---|---|
| Water | 51-58 |
| Xylene | 0.001-0.0015 |
| polypropylene glycol | 0.14-0.30 |
| polysiloxanes | 0.024-0.030 |
| functionalized polyacrylate copolymer | 0.24-0.27 |
| titanium dioxide | 19-24 |
| aluminum hydroxide | 1-2.5 |
| amorphous silica | 1-2.5 |
| 2-amino-2-methyl-1-propanol | 0.14-0.18 |
| 2-(methylamino)-2-methyl-1-propanol | 0.008-0.010 |
| epoxy based styrene-acrylic copolymer | 21-24 |
| dipropylene glycol monomethyl ether | 19-22 |
| 2,2,4-trimethyl-1,3-pentanediol monoisobutyrate | 19.5-22.5 |
| Polyurethane resin | 0.10-0.11 |
| Polyurethane resin | 0.39-0.44 |
| 2-butoxyethanol | 0.18-0.24 |

Example 14

Quantitative Determination of the Erasable Characteristics of the Writable-Erasable Surface The color stimulus, which is the radiation from the colored object that produces the perception of that color, can be measured. Color perception is affected not only by the spectral make up of the object, but also the light source under which it is viewed. If the spectral distribution of the light source and the relative spectral reflectance of the object are known, then the spectral composition reaching the eye of an observer with normal vision from the object illuminated by that source can be calculated. The Commission Internationale de L'Eclairage (CIE) has set up procedures for calculation of the color differences in a CIELAB color space. The X-Rite Sp-62 Spectrophotometer can be used to take the color readings and it calculates these values automatically. The values can then be recorded. The changes can then be calculated according to ASTM Test Method D2244, as differences in the L*, a*, and b* values, where the direction of the color difference is described by the magnitude and the algebraic signs of the components, $\Delta L^*$, $\Delta a^*$, $\Delta b^*$. The values are then calculated as follows:

$$\Delta L^* = L^*_1 - L^*_0 \tag{1}$$

$$\Delta a^* = a^*_1 - a^*_0 \tag{2}$$

$$\Delta b^* = b^*_1 - b^*_0 \tag{3}$$

where $L^*_0$, $a^*_0$, $b^*_0$ refers to the reference, and $L^*_1$, $a^*_1$, $b^*_1$, refers to the test specimen. Table 14 shows the magnitude and direction of each color value and what color change occurs.

TABLE 14

Meanings of Color Values

| Direction | Color Change Value | Result |
|---|---|---|
| + | L* | Lighter |
| − | L* | Darker |
| + | A* | Redder (less green) |
| − | A* | Green (less red) |
| + | B* | Yellow (less blue) |
| − | B* | Bluer (less yellow) |

By choosing one sample to be the reference point, the change in color from this reference point is called the color difference ($\Delta E$), which is calculated from the equation:

$$\Delta E = [(\Delta L^*)^2 + (\Delta a^*)^2 + (\Delta b^*)^2]^{1/2} \tag{4}$$

Example 15

Determination of Erasable Characteristics of a Writable-Erasable Surface

The nature of visual change (erasable characteristics) on the writable-erasable surface can be evaluated by the visual change perceived after the surface has been marked followed by erasing the marking. It can be characterized by the leave behind which can be determined after 1 or 2 passes by the eraser to erase the marking: the markings may seem to stick to the surface and they might erase as in streaks or might be spotty. The quality of the surface can also be measured by the dirtiness which can be determined after one pass with the eraser over the marked area, a faint to dark cloud might be left from the eraser, like smearing of the marking due to the eraser. Both "leave behind" and "dirtiness" can be measured on a scale of zero to ten based on the degree to which the marking material can be removed from the surface. The lower number indicates a better surface performance.

Example 16

Application of the Coating

The application is performed in a clean, dustless environment. Prior to installation, the ambient temperature within the application site is maintained at not less than 45° F. for a minimum of 24 hours and proper ventilation of application areas is ascertained to minimize odors in vicinity of application. The surface of the substrate to be painted on is primed, using a non-tinted PVA or vinyl acrylic interior latex primer, until the color of the existing surface does not show through. The primer is allowed to dry completely according to manufacturer's recommendation. The surface is painted in approximately 2 foot wide sections by working from one end to the other. Each section is completed before painting the next section. A wet edge is maintained to avoid lap marks. A single coat is applied using foam roller covers. The equipment is cleaned with acetone or denatured alcohol. The coating is allowed to cure for 1 week, at room temperature, to form the writable-erasable surface.

The writable-erasable surface can be maintained by daily erasure and cleaning with a standard dry-erase eraser or a dry cloth. For periodic and more thorough cleaning, a damp cloth may be used.

If it is desired to clear the writable-erasable surface or recoat any damaged surface, the original surface is deglossed by sanding the surface and priming before application of the dry erase coating.

OTHER IMPLEMENTATIONS

A number of implementations have been described. Nevertheless, it will be understood that various modifications can be made without departing from the spirit and scope of the disclosure. Accordingly, other implementations are within the scope of the following claims.

For example, while rollers have been described for applying the materials, brushes, pre-loaded applicators, or sprayers can be used. When sprayers are used, the precursor materials can be first mixed and then sprayed onto a substrate, or the precursor materials can each be sprayed from separate nozzle outlet, the mixing of the precursors occurring in flight toward the substrate and/or on the substrate.

Figure 3:
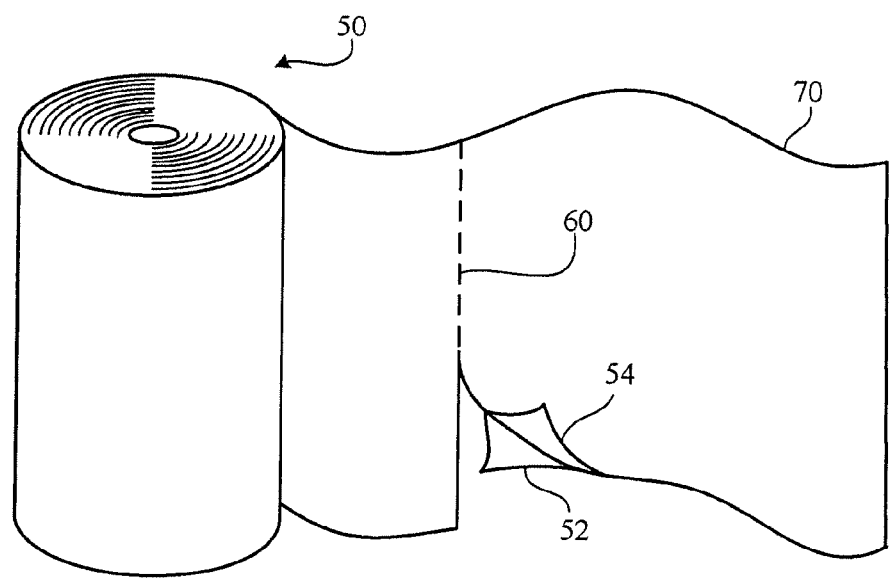
FIG. 3 is a perspective view of a coated roll of paper.
Figure 4:
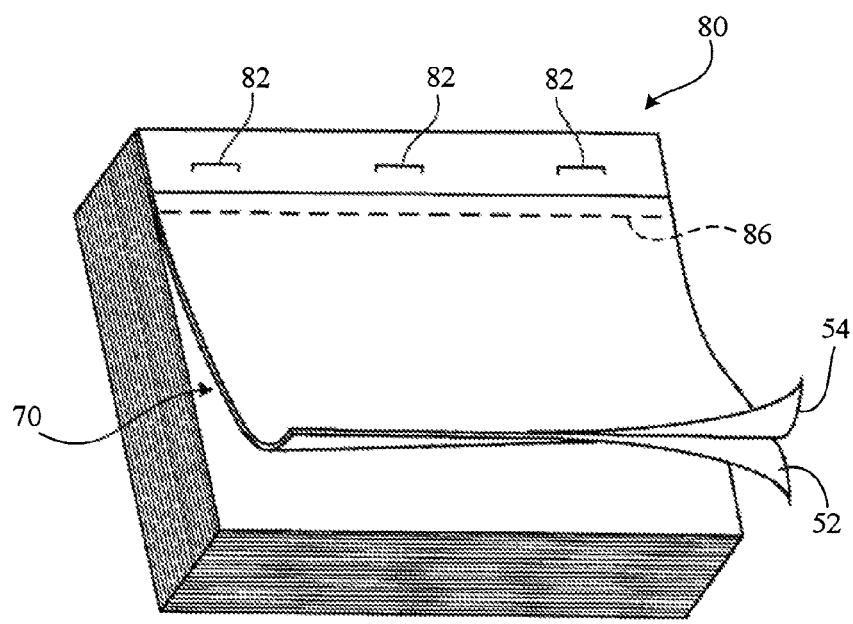
FIG. 4 is a perspective view of a tablet of coated papers formed from the roll of FIG. 3.

While whiteboards and coated walls have been described, the coatings can be applied to other forms. For example, referring now to FIG. 3, any of the materials described herein can be applied to a continuous sheet of material, such as paper, to provide a product 50 that includes a substrate 52 and a coating 54 extending upon the substrate 52. As shown in FIG. 3, the product 50 can be conveniently stored in a roll form. If desired, product 50 can be cut, e.g., along a transverse line 60, to provide individual sheets 70 of material. Referring now to FIG. 4, sheets 70 can be fashioned into a product 80 in tablet form using fasteners 82. If desired, the assembled sheets can have perforations 86, allowing sheets to be torn from the tablet and used as a mobile writable-erasable product.

Blends of polyurethane materials and any one of, some of, or all of epoxy resins, acrylic resins described herein can be used to make the coatings having the writable-erasable surface.

Other water-based materials may be used alone, or in combination with other water-based materials described herein, such as polyurethane materials. For example, epoxy resins in a water-based carrier may be utilized. These epoxy resins may be used in conjunction with various crosslinkers and/or additives described herein. For example, the crosslinkers can be a moiety that includes a plurality of amino groups, thiol groups, hydroxyl groups or mixtures of such groups. Water-based epoxy resins are commercially available under the name Enducryl® from Epoxy Systems, Inc.

The first and second components can be applied to the substrate, e.g., by concurrently spraying the components so that they mix in flight and/or on the substrate, and then optionally applying a crosslinking promoter, such as an acid, to the mixed first and second components, e.g., in the form of a solution. In still other implementations, a crosslinking promoter is first applied to the substrate, and then the first and second components are applied to the substrate having the crosslinking promoter.

The first and second components can be mixed, e.g., by alternately adding the desired, pre-determined quantities of the components from a large drum to a paint bucket, mixing, and then applying the coating on a substrate. The advantage of this method is that the pot life of the components are preserved without wasting the components.

Still other implementations are within the scope of the following claims.

What is claimed is:

1. A method comprising:
    combining an isocyanate resin component and an acrylic polyol resin component with each other to form a composition, wherein the composition is in a water-based carrier, and further wherein the isocyanate resin component is 20-40% by weight of the composition, the acrylic polyol resin component is 10-20% by weight of the composition, and the isocyanate resin component and the acrylic polyol resin component are present in relative amounts with respect to each other such that the composition cures under ambient conditions to form a material having a write-erasable surface, which material has at least one characteristic selected from the group consisting of:
    a Sward hardness of greater than about 25;
    a Taber abrasion of less than 150 mg/thousand cycles;
    an elongation at break between about 5 percent and about 400 percent;
    a sag resistance between about 4 mils to about 24 mils;
    a contact angle measured from a surface of the material using deionized water of less than about 150 degree; and combination thereof,
    which material is further characterized in that, when its surface is written on with a marking material comprising a colorant and a solvent, the solvent comprising one or more of water, alcohols, alkoxy alcohols, ketones, ketonic alcohols, esters, acetates, mineral spirits, or mixtures thereof, the marking material can be erased from the surface of the write-erasable material to be substantially invisible for more than 100 cycles of writing and erasing at the same position.

2. The method of claim 1, wherein the composition has pot life in a range of about 10 minutes to about 16 hours.

3. The method of claim 1, further comprising a step of applying the composition to a substrate.

4. The method of claim 3, wherein the step of combining and the step of applying are performed substantially simultaneously.

5. The method of claim 3, wherein the step of applying comprises rolling, painting, spraying or any combination thereof.

6. The method of claim 3, further comprising a step of permitting the composition to cure so that the material having a write-erasable surface is formed.

7. The method of claim 6, further comprising a step of writing with a marking material on the write-erasable surface.

8. The method of claim 7, further comprising a step of erasing the marking material.

9. The method of claim 1, wherein before the step of combining the acrylic polyol resin component and the isocyanate resin component are separately stored.

10. The method of claim 9, wherein the acrylic polyol resin component and the isocyanate component are maintained in separate containers prior to their combination.

* * * * *